(12) United States Patent
Segawa

(10) Patent No.: US 12,276,321 B2
(45) Date of Patent: Apr. 15, 2025

(54) BALL SCREW DEVICE

(71) Applicant: NSK LTD., Tokyo (JP)

(72) Inventor: Ryo Segawa, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/030,200

(22) PCT Filed: Jun. 16, 2022

(86) PCT No.: PCT/JP2022/024123
§ 371 (c)(1),
(2) Date: Apr. 4, 2023

(87) PCT Pub. No.: WO2023/282012
PCT Pub. Date: Jan. 12, 2023

(65) Prior Publication Data
US 2023/0375081 A1 Nov. 23, 2023

(30) Foreign Application Priority Data
Jul. 5, 2021 (JP) .................................. 2021-111207

(51) Int. Cl.
*F16H 25/20* (2006.01)
*F16H 25/22* (2006.01)

(52) U.S. Cl.
CPC ................................ *F16H 25/2214* (2013.01)

(58) Field of Classification Search
CPC .. F16H 25/2214; F16H 25/2204; F16H 25/22; F16H 25/2247; F16H 2025/228
See application file for complete search history.

(56) References Cited

U.S. PATENT DOCUMENTS

2003/0178264 A1* 9/2003 Halasy-Wimmer ..... F16D 65/18
188/72.1
2009/0049938 A1 2/2009 Teramachi et al.
(Continued)

FOREIGN PATENT DOCUMENTS

JP 60-189649 U 12/1985
JP 2007-303515 A 11/2007
(Continued)

OTHER PUBLICATIONS

International Search Report for PCT/JP2022/024123, dated Jul. 19, 2022.
(Continued)

*Primary Examiner* — Zakaria Elahmadi
(74) *Attorney, Agent, or Firm* — Sughrue Mion, PLLC

(57) ABSTRACT

The ball screw device has a nut having a guide concave groove on the outer-circumferential surface capable of engaging with a rotation restraining member in the circumferential direction, a housing provided with an insertion hole having a retaining concave groove on the inner-circumferential surface capable of engaging with the rotation restraining member in the circumferential direction, the rotation restraining member configured by a shaft-shaped member extending in the axial direction, the rotation restraining member having an outside portion in the radial direction arranged inside the retaining concave groove and an inside portion in the radial direction arranged inside the guide concave groove, so as to be able to slide in the axial direction.

10 Claims, 16 Drawing Sheets

(56) References Cited

U.S. PATENT DOCUMENTS

| | | | | |
|---|---|---|---|---|
| 2012/0018262 A1* | 1/2012 | Winkler | ............... | F16D 65/18 |
| | | | | 188/106 F |
| 2013/0299631 A1* | 11/2013 | Tucker | ................ | B64C 25/14 |
| | | | | 244/102 R |
| 2016/0033018 A1* | 2/2016 | Tashiro | ............... | F16D 65/18 |
| | | | | 74/424.81 |
| 2020/0088247 A1* | 3/2020 | Ryba | ................... | F16D 28/00 |

FOREIGN PATENT DOCUMENTS

| | | |
|---|---|---|
| JP | 2009-241660 A | 10/2009 |
| JP | 2014-145465 A | 8/2014 |
| JP | 2021-035311 A | 3/2021 |
| WO | 2006/106817 A1 | 10/2006 |

OTHER PUBLICATIONS

Extended European Search Report Dated Mar. 1, 2024 in Application No. 22837430.2.

* cited by examiner

BALL SCREW DEVICE

CROSS REFERENCE TO RELATED APPLICATIONS

This application is a National Stage of International Application No. PCT/JP2022/024123 filed Jun. 16, 2022, claiming priority based on Japanese Patent Application No. 2021-111207 filed Jul. 5, 2021.

TECHNICAL FIELD

The present invention relates to a ball screw device.

BACKGROUND ART

A ball screw device is one of the machine element parts for converting linear motion to rotational motion or rotational motion to linear motion. Since balls roll between a screw shaft and a nut, a higher efficiency can be obtained compared to a sliding screw device in which a screw shaft is in direct contact with a nut. Therefore, in order to convert rotational motion of a driving source such as an electric motor to linear motion, the ball screw device is assembled in various mechanical devices such as an electric braking device and an automatic manual transmission (AMT) of an automobile and a positioning device of a machine tool.

The ball screw device has a screw shaft having a shaft-side ball thread groove having a spiral shape on the outer-circumferential surface, a nut having a nut-side ball thread groove having a spiral shape on the inner-circumferential surface, and balls arranged between the shaft-side ball thread groove and the nut-side ball thread groove. In the ball screw device, either one of the screw shaft or the nut is used as a rotational motion element and the other of the screw shaft and the nut is used as a linear motion element, depending on the application.

In the ball screw device, rotation of the linear motion element is blocked in order to prevent the linear motion element from co-rotation with the rotational motion element. FIG. 15 and FIG. 16 illustrate a ball screw device 100 having a conventional structure for preventing rotation of a linear motion element described in JP 2007-303515 A.

The ball screw device 100 includes a screw shaft 101, a nut 102, balls 103, an advance/retreat member 104, and a housing 105.

The screw shaft 101 has a shaft-side ball thread groove 106 having a spiral shape on the outer-circumferential surface and rotationally moves during use. Therefore, the screw shaft 101 is a rotational motion element and is supported so as to be freely rotatable with respect to the housing 105.

The nut 102 has a nut-side ball thread groove 107 having a spiral shape on the inner-circumferential surface and linearly moves during use. Therefore, the nut 102 is a linear motion element and relative rotation with respect to the housing 105 is prevented.

The screw shaft 101 is inserted inside the nut 102 and arranged coaxially with the nut 102. The shaft-side ball thread groove 106 and the nut-side ball thread groove 107 are arranged so as to face each other in the radial direction and form a spiral load path.

The start point and the end point of the load path 108 are connected by a circulation means (not illustrated). The balls 103 that have reached the end point of the load path 108 are returned to the start point of the load path 108 through the circulation means. The start point and the end point of the load path 108 are interchanged depending on the direction of relative displacement in the axial direction (direction of relative rotation) between the screw shaft 101 and the nut 102.

The advance/retreat member 104 has a cylindrical shape with a bottom, and is externally fitted and fixed to the nut 102 so as not to be able to rotate relative to the nut 102. The advance/retreat member 104 has an outer diameter larger than the outer diameter of the nut 102. The advance/retreat member 104 has a key groove 109 extending in the axial direction on the outer-circumferential surface.

The housing 105 has an insertion hole 110 through which the nut 102 and the advance/retreat member 104 can be inserted in the axial direction. The insertion hole 110 has a key 111 protruding toward inside in the radial direction on the inner-circumferential surface. The key 111 is engaged with the key groove 109 provided on the outer-circumferential surface of the advance/retreat member 104 so as to be able to slide in the axial direction. This configuration prevents the nut 102 from rotating relative to the housing and allows the nut 2 to move linearly.

CITATION LIST

Patent Literature

Patent Literature 1: JP 2007-303515 A

SUMMARY OF THE INVENTION

Technical Problem

In the ball screw device 100 having a conventional structure described in JP 2007-303515 A, the key 111 is integrally formed on the inner-circumferential surface of the insertion hole 110. Due to this, it is difficult to ensure the shape accuracy of the key 111. In order to integrally form the key 111 on the inner-circumferential surface of the insertion hole 110 and ensure the shape accuracy of the key 111, the manufacturing cost tends to increase. For example, if the key is processed by cutting, the key can be formed integrally with the inner-circumferential surface of the insertion hole and the shape accuracy of the key can be ensured, but the yield will decrease and the manufacturing cost will tend to increase.

The present invention has been made to solve the above problems, and the object of the present invention is to provide a ball screw device capable of preventing rotation of the nut, which is a linear motion element, at low cost.

Solution to Problem

The ball screw device of one aspect of the present invention includes a screw shaft, a nut, balls, a housing, and a rotation restraining member.

The screw shaft has a shaft-side ball thread groove having a spiral shape on an outer-circumferential surface thereof and rotationally moves during use.

The nut has a nut-side ball thread groove having a spiral shape on an inner-circumferential surface thereof and linearly moves during use.

The balls are arranged between the shaft-side ball thread groove and the nut-side ball thread groove.

The housing has an insertion hole through which the nut can be inserted in the axial direction.

The rotation restraining member prevents relative rotation of the nut with respect to the housing.

In the ball screw device of one aspect of the present invention, the nut may have a guide concave groove on an outer-circumferential surface thereof capable of engaging with the rotation restraining member in the circumferential direction.

The insertion hole may have a retaining concave groove on an inner-circumferential surface capable of engaging with the rotation restraining member in the circumferential direction.

The rotation restraining member may be configured by a shaft-shaped member extending in the axial direction, in which an outside portion thereof in the radial direction is arranged inside the retaining concave groove and an inside portion thereof in the radial direction is arranged inside the guide concave groove so as to be able to relatively slide in the axial direction.

In the ball screw device of one aspect of the present invention, the nut may have a circulation groove on the inner-circumferential surface, and the guide concave groove may be arranged so as to be shifted from the circulation groove in the circumferential direction.

In this case, the circulation groove of the nut may be configured by a plurality of circulation grooves provided at locations evenly spaced in the circumferential direction, and the guide concave groove can be arranged so as to be shifted by the same angle to opposite sides in the circumferential direction from two circulation grooves of the plurality of circulation grooves that are adjacent to each other in the circumferential direction. In other words, the guide concave groove may be arranged at a central position in the circumferential direction between the two circulation grooves adjacent to each other in the circumferential direction.

The ball screw device of one aspect of the present invention includes a circulation component that has the circulation groove and is fixed to the nut, and the guide concave groove may be arranged so as to be shifted from the circulation component in the circumferential direction.

In this case, the circulation component may be configured by a plurality of circulation components provided at locations evenly spaced in the circumferential direction, and the guide concave groove may be arranged so as to be shifted by the same angle to opposite sides in the circumferential direction from two circulation components of the plurality of circulation components that are adjacent to each other in the circumferential direction. In other words, the guide concave groove may be arranged at a central position in the circumferential direction between the two circulation components adjacent to each other in the circumferential direction.

In the ball screw device of one aspect of the present invention, the guide concave groove may be configured by a plurality of guide concave grooves, and the rotation restraining member may be configured by a plurality of rotation restraining members having the same number as the plurality of guide concave grooves.

Alternatively, the guide concave groove may be configured by one guide concave groove and the rotation restraining member may be configured by one rotation restraining member.

In the ball screw device of one aspect of the present invention, the nut may have an outward flange portion protruding toward outside in the radial direction, and the guide concave groove may be provided only in the outward flange portion.

In the ball screw device of one aspect of the present invention, the rotation restraining member may be prevented from coming off in the axial direction by surfaces that axially face end surfaces on both sides in the axial direction of the rotation restraining member.

In the ball screw device of one aspect of the present invention, a gap may be provided between an end surface on one side in the axial direction of the rotation restraining member and a surface that axially faces the end surface on the one side in the axial direction and/or between an end surface on the other side in the axial direction of the rotation restraining member and a surface that axially faces the end surface on the other side in the axial direction.

Alternatively, the rotation restraining member may be supported and fixed to the housing by holding the rotation restraining member from both sides in the axial direction by the surfaces that axially face the end surfaces on both sides in the axial direction of the rotation restraining member. In other words, the rotation restraining member may be supported and fixed to the housing by abutting an end surface on one side in the axial direction of the rotation restraining member and a surface that axially faces the end surface on the one side in the axial direction, and by abutting an end surface on the other side in the axial direction of the rotation restraining member and a surfaces that axially faces the end surface on the other side in the axial direction.

In this case, the surface that axially faces the end surface on the other side in the axial direction of the rotation restraining member may be provided with an engaging concave portion formed in a small-diameter stepped surface facing the one side in the axial direction that is provided in the insertion hole, and the end portion on the other side in the axial direction of the rotation restraining member may be engaged with the engaging concave portion.

The ball screw device of one aspect of the present invention may include a piston that is fixed to the nut and linearly moves together with the nut. Further, the inner-circumferential surface of the nut may have a small-diameter surface portion which has the nut-side ball thread groove and a large-diameter surface portion which is deviated from the small-diameter surface portion in the axial direction and has a cylindrical surface shape having an inner diameter larger than that of the small-diameter surface portion, and the piston may be internally fitted and fixed to the large-diameter surface portion.

Effect of Invention

With the ball screw device of one aspect of the present invention, rotation of the nut, which is a linear motion element, can be achieved at low cost.

DESCRIPTION OF THE EMBODIMENTS

First Example

Figure 1:
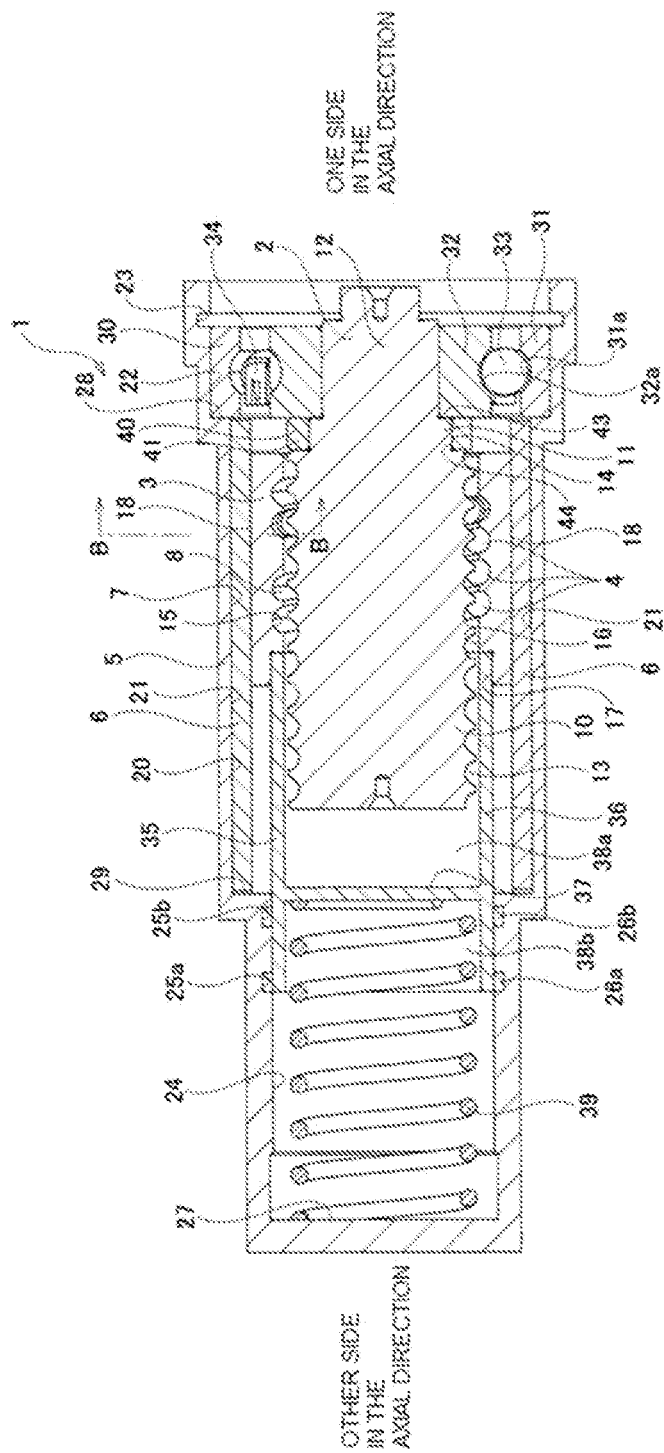
FIG. 1 is a cross-sectional view of a ball screw device according to a first example of an embodiment of the present invention.

FIG. 1 to FIG. 8 show a first example of an embodiment of the present invention.
[Overall Configuration of Ball Screw Device]

The ball screw device 1 of this example is incorporated in, for example, an electric booster device and is used for applications such as converting rotational motion of an electric motor (not illustrated), which is a driving source, into linear motion of a piston 35.

The ball screw device 1 includes a screw shaft 2, a nut 3, balls 4, a housing 5, and a rotation restraining member 6.

The screw shaft 2 is a rotational motion element that is rotationally driven by a driving source (not illustrated) and rotationally moves during use. The screw shaft 2 is inserted inside the nut 3 and arranged coaxially with the nut 3. The nut 3 is prevented from relatively rotating with respect to the housing 5 by the rotation restraining member 6. The nut 3 is a linear motion element that linearly moves inside the insertion hole 7 provided in the housing 5 together with the piston 35 fixed to the nut 3. Therefore, the ball screw device 1 of this example is used in a mode wherein the screw shaft 2 is rotationally driven and the nut 3 is linearly moved.

A spiral load path 8 is provided between the outer-circumferential surface of the screw shaft 2 and the inner-circumferential surface of the nut 3. The balls 4 are arranged in the load path 8 so as to be able to roll. When the screw shaft 2 and the nut 3 are relatively rotated, the balls 4 that have reached the end point of the load path 8 are returned to the start point of the load path 8 through a circulation groove 9 (see FIG. 5) formed on the inner-circumferential surface of the nut 3. The structures of the components of the ball screw device 1 will be described below.

In the following description, the axial direction, the radial direction, and the circumferential direction mean, unless specified otherwise, the axial direction, the radial direction, and the circumferential direction in relation to the screw shaft 2. Further, one side in the axial direction is referred to as the right side in FIG. 1 to FIG. 5, and the other side in the axial direction is referred to as the left side in FIG. 1 to FIG. 5.
[Screw Shaft]

The screw shaft 2 is made of metal, and has a screw portion 10, a first fitting shaft portion 11, and a second fitting shaft portion 12. The screw portion 10, the first fitting shaft portion 11, and the second fitting shaft portion 12 are arranged coaxially and integrally configured with each other.

The screw portion 10 has a shaft-side ball thread groove 13 having a spiral shape on the outer-circumferential surface. The shaft-side ball thread groove 13 is formed by performing a grinding process (cutting process) or a rolling process to the outer-circumferential surface of the screw portion 9. In this example, the number of threads of the shaft-side ball thread groove is one. The groove shape (groove bottom shape) of the shaft-side ball thread groove 13 is a Gothic arch shape or a circular arc shape.

The first fitting shaft portion 11 is arranged adjacent to the one side in the axial direction of the screw portion 10 and has a diameter smaller than the screw portion 10. The first fitting shaft portion 11 has an outer diameter smaller than the groove bottom diameter of the shaft-side ball thread groove 13. The first fitting shaft portion 11 has male spline teeth 14 on the outer-circumferential surface over the entire circumference. Due to this, the first fitting shaft portion 11 is a spline shaft portion. Involute spline teeth or angular spline teeth can be adopted for the male spline teeth 14. The first fitting shaft portion 11 can also be a serration shaft portion having male serration teeth on the outer-circumferential surface.

The second fitting shaft portion 12 is arranged adjacent to the one side in the axial direction of the first fitting shaft portion 11 and has a diameter smaller than the first fitting shaft portion 11. The second fitting shaft portion 12 has an outer-circumferential surface having a cylindrical surface shape.

The screw shaft 2 is arranged coaxially with the nut 3 with the screw portion 10 inserted inside the nut 3.
[Nut]

The nut 3 is made of metal and is configured to be cylindrical as a whole. The nut 3 has a nut-side ball thread groove 15 having a spiral shape and a circulation groove 9 on the inner-circumferential surface.

The nut-side ball thread groove 15 has a spiral shape, and is formed by performing, for example. a grinding process (cutting process) or a rolling tapping process (cutting tapping process) to the inner-circumferential surface of the nut 3. The nut-side ball thread groove 15 has the same lead as the shaft-side ball thread groove 13. Therefore, in a state where the screw portion 10 of the screw shaft 2 is inserted inside the nut 3, the shaft-side ball thread groove 13 and the nut-side ball thread groove 15 are arranged so as to face each other in the radial direction to form the spiral load path 8. The number of threads of the nut-side ball thread groove 15 is one, as the same as that of the shaft-side ball thread groove 13. The groove shape of the cross section of the nut-side ball thread groove 15 is a Gothic arch shape or a circular arc shape as the same as the shaft-side ball thread groove 13.

The circulation groove 9 has a substantially S-shape, and is formed on the inner-circumferential surface of the nut 3 by, for example, a forging process (cold forging process).

The circulation groove 9 smoothly connects axially adjacent portions of the nut-side ball thread groove 15 and connects the start point and the end point of the load path 8. Therefore, the balls 4 that have reached the end point of the load path 8 are returned to the start point of the load path 8 through the circulation groove 9. Therefore, the balls 4 that have reached the end point of the load path 8 are returned to the start point of the load path 8 through the circulation groove 9. The start point and the end point of the load path 8 are interchanged depending on the direction of relative displacement in the axial direction (direction of relative rotation) between the screw shaft 2 and the nut 3.

The circulation groove 9 has a semi-circular cross-sectional shape. The circulation groove 9 has a groove width slightly larger than the diameter of the balls 4 and a groove depth that allows the balls 4 moving in the circulation grooves 9 to climb over the thread ridges of the shaft-side ball thread groove 13. In this example, the inner-circumferential surface of the nut 3 is provided with four circulation grooves 9 that are uniformly spaced in the circumferential direction (at equal intervals of 90 degrees). Due to this, the ball screw device 1 of this example includes four circuits. In the ball screw device 1 of this example, the circulation groove 9 is directly formed on the inner-circumferential surface of the nut 3. However, it is also possible to form the circulation groove in a circulation component (for example, a circulation piece) that is separate from the nut and fix the circulation component to the nut.

The nut 3 has an outer-circumferential surface having a cylindrical surface shape whose outer diameter does not change over the axial direction. Further, in this example, the inner-circumferential surface of the nut 3 is configured by a stepped cylindrical surface. Specifically, the nut 3 has a small-diameter surface portion 16 having the nut-side ball thread groove 15 formed on the inner-circumferential surface and a cylindrical surface-shaped large-diameter surface portion 17 having an inner diameter larger than the small-diameter surface portion 16, which is provided in a portion separated from the small-diameter surface portion 16 to the other side in the axial direction.

The ball screw device 1 of this example uses the nut 3 as a linear motion element. Therefore, in order to prevent rotation of the nut 3, a guide concave groove 18 which can be engaged with the rotation restraining member 6 is provided on the outer-circumferential surface of the nut 3. The guide concave groove 18 is respectively provided at locations in the circumferential direction (in this example, two locations) of the outer-circumferential surface of the nut 3.

The guide concave groove 18 is a concave groove extending in the axial direction, and is provided over the entire length in the axial direction of the nut 3. As a result, the guide concave groove 18 is open on the outer-circumferential surface of the nut 3 and the end surfaces on both sides in the axial direction of the nut 3. The center axis of the guide concave groove 18 is arranged so as to be parallel to the center axis of the nut 3.

Figure 8:
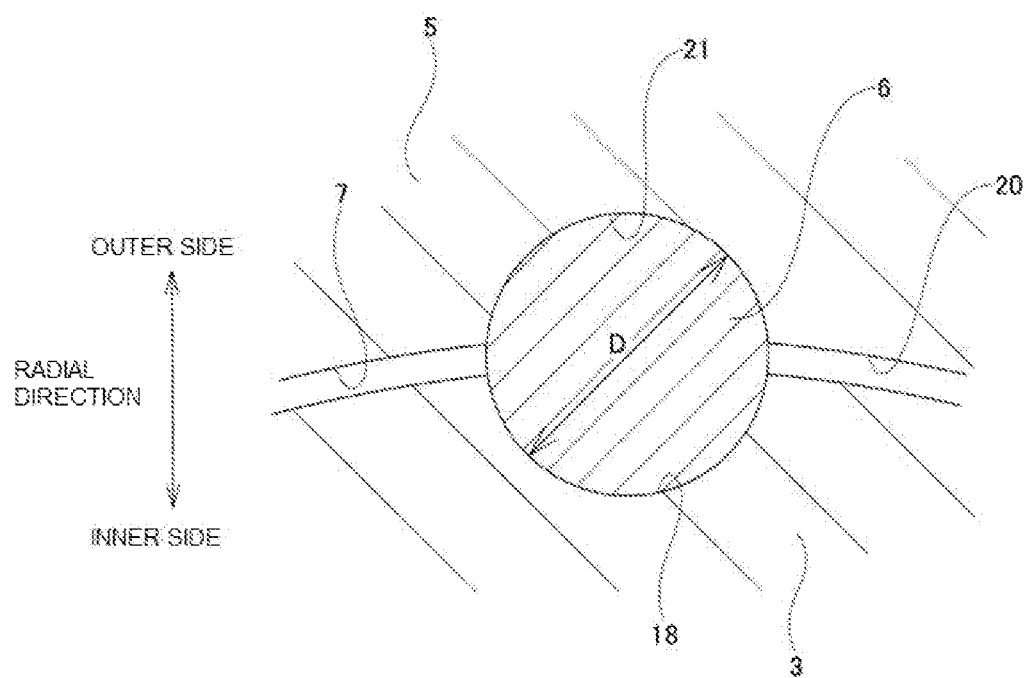
FIG. 8 is a schematic view corresponding to a cross-sectional view of section A-A in FIG. 1.

The guide concave groove 18 has a cross-sectional shape that can be engaged with the inside portion in the radial direction of the rotation restraining member 6 in the circumferential direction. In this example, since the rotation restraining member 6 is configured in a columnar shape, as illustrated in FIG. 8, the cross-sectional shape of the guide concave groove 18 with respect to a virtual plane perpendicular to the center axis of the nut 3 is arc-shaped. Specifically, the cross-sectional shape of the guide concave groove 18 is a semicircular arc with a center angle of about 180 degrees. Therefore, the width in the circumferential direction of the guide concave groove 18 (width in the left-right direction in FIG. 8) becomes larger toward outside in the radial direction.

In a case of implementing the present invention, the cross-sectional shape of the guide concave groove may be an arc-shape with a center angle smaller than 180 degrees or an arc-shape with a center angle larger than 180 degrees, provided that the nut can be prevented from rotating by engagement with the rotation restraining member in the circumferential direction.

The guide concave groove 18 has a radius of curvature that is the same as or slightly larger than ½ of the diameter D of the rotation restraining member 6. The opening width in the circumferential direction of the guide concave groove 18 on the outer-circumferential surface of the nut 3 is approximately the same as the diameter D of the rotation restraining member 6. Further, the diameter of the inscribed circle passing through the portion of the guide concave groove 18 where the depth in the radial direction is the largest is larger than the inner diameter of the large-diameter surface portion 17.

The guide concave grooves 18 are arranged on the outer-circumferential surface of the nut 3 so as to be uniformly spaced in the circumferential direction. In this example, since two guide concave grooves 18 are provided, the two guide concave grooves 18 are arranged at positions 180 degrees out of phase. Further, each of the guide concave grooves 18 is arranged in a position (phase) shifted in the circumferential direction from all of the circulation grooves 9 provided on the inner-circumferential surface of the nut 3.

Figure 6:
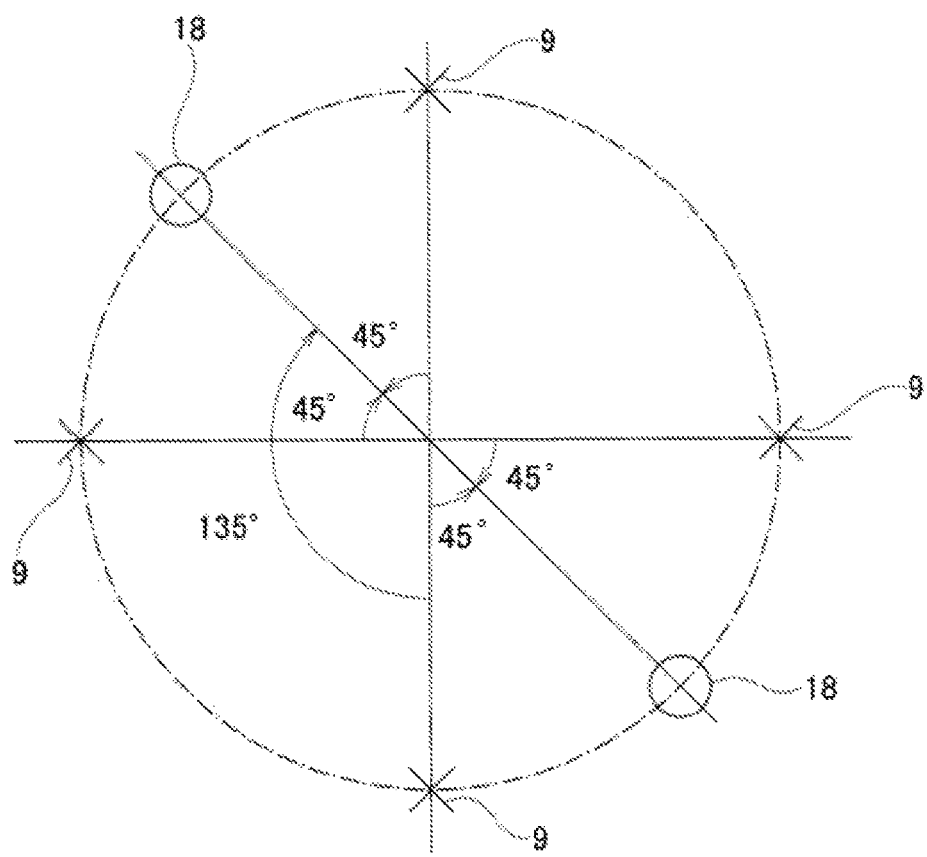
FIG. 6 is a schematic view related to the first example, illustrated in order to explain the positional relationship in the circumferential direction between the circulation grooves and the guide concave grooves.

Specifically, of the two guide concave grooves 18, one guide concave groove 18 (lower guide concave groove 18 in FIG. 5) is arranged so as to be shifted by 45 degrees to one side in the circumferential direction from the central portion of one of the circulation grooves 9 provided on the inner-circumferential surface of the nut 3, which is adjacent in the circumferential direction. Further, of the two guide concave grooves 18, the other guide concave groove 18 (upper guide concave groove 18 in FIG. 5) is arranged so as to be shifted by 135 degrees to the other side in the circumferential direction from the central portion of the one circulation groove 9. Therefore, as illustrated in FIG. 6, when the nut 3 is viewed from the axial direction, each of the two guide concave grooves 18 indicated by circles is arranged so as to be shifted by 45 degrees to the opposite sides in the circumferential direction with respect to two circulation grooves 9 adjacent in the circumferential direction that are indicated by x. In other words, the one guide concave groove 18 is arranged in the central position in the circumferential direction between two circulation grooves 9 of the four circulation grooves 9 that are adjacent in the circumferential direction, and the other guide concave groove 18 is arranged in the central position in the circumferential direction between the remaining two circulation grooves 9.

When a configuration is adopted in which a circulation component such as a circulation piece having a circulation groove is fixed to the nut, the guide concave grooves can be arranged so as to be shifted in the circumferential direction from the circulation component. Further, when the circulation components are provided at locations evenly spaced in the circumferential direction, the guide concave groove can be arranged so as to be shifted by the same angle to opposite sides in the circumferential direction from the two circulation components adjacent to each other in the circumferential direction. In other words, the guide concave groove can be arranged at a central position in the circumferential direction between the two circulation components adjacent to each other in the circumferential direction.

The nut 3 has a non-rotating side engaging portion 19 at an end portion on the one side in the axial direction. The non-rotating side engaging portion 19 is provided on a portion in the circumferential direction of a side surface on the one side in the axial direction of the nut 3, and protrudes toward the one side in the axial direction. The non-rotating side engaging portion 19 has a fan column shape. In the illustrated example, the nut 3 is configured integrally as a whole including the non-rotating side engaging portion 19. However, in a case of implementing the present invention, the nut can also be configured by connecting and fixing a cylindrical member having a nut-side ball thread groove on the inner-circumferential surface and a separately configured non-rotating side engaging portion.

[Balls]

The balls 4 are steel balls each having a predetermined diameter, and are arranged in the load path 8 and the circulation grooves 9 so as to be able to roll. The balls 4 arranged in the load path 8 roll while receiving a compressive load, whereas the balls 4 arranged in the circulation grooves 9 are pushed by the succeeding balls 4 and roll without receiving a compressive load.

[Housing]

The housing 5 is made of metal such as aluminum alloy, has a cylindrical shape with a bottom, and has an insertion hole 7, which is a stepped hole, inside thereof. The center axis of the insertion hole 7 is arranged coaxially with the center axis of the screw shaft 2.

The insertion hole 7 has a nut insertion portion 20 through which the nut 3 can be axially inserted in an intermediate portion in the axial direction. The nut insertion portion 20 has an inner diameter slightly larger than the outer diameter of the nut 3. The nut insertion portion 20 has an inner-circumferential surface having a cylindrical surface shape. The dimension in the axial direction of the nut insertion portion 20 is sufficiently larger than the dimension in the axial direction of the nut 3.

Figure 3:
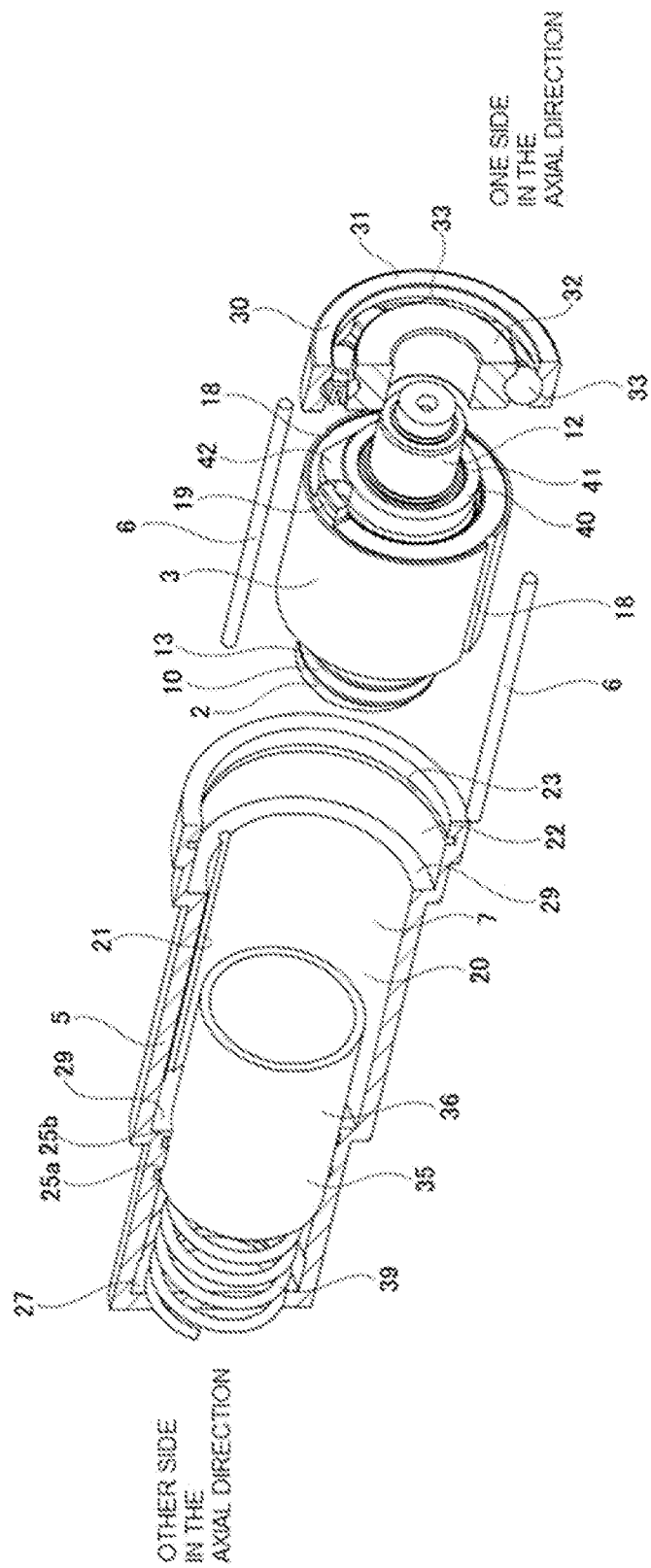
FIG. 3 is a partial cross-sectional exploded perspective view of the ball screw device according to the first example.
Figure 4:
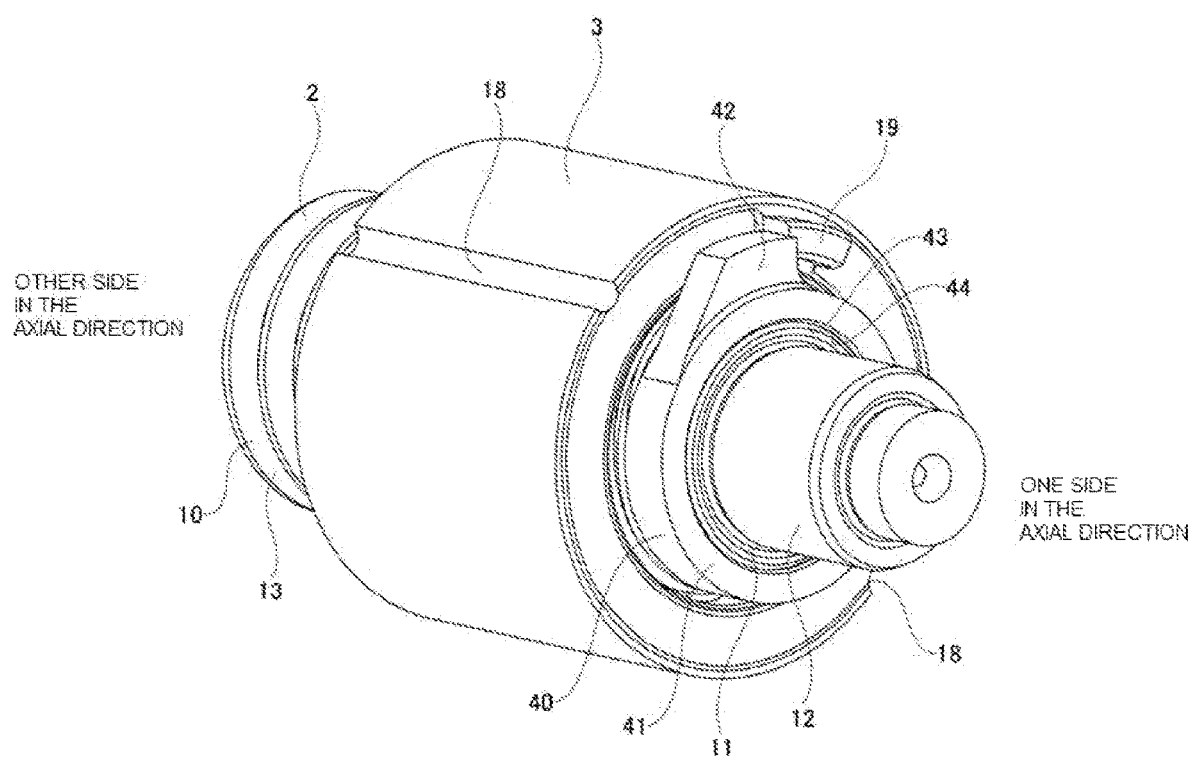
FIG. 4 is a perspective view of the ball screw device according to the first example with a housing and a rotation restraining member omitted.
Figure 5:
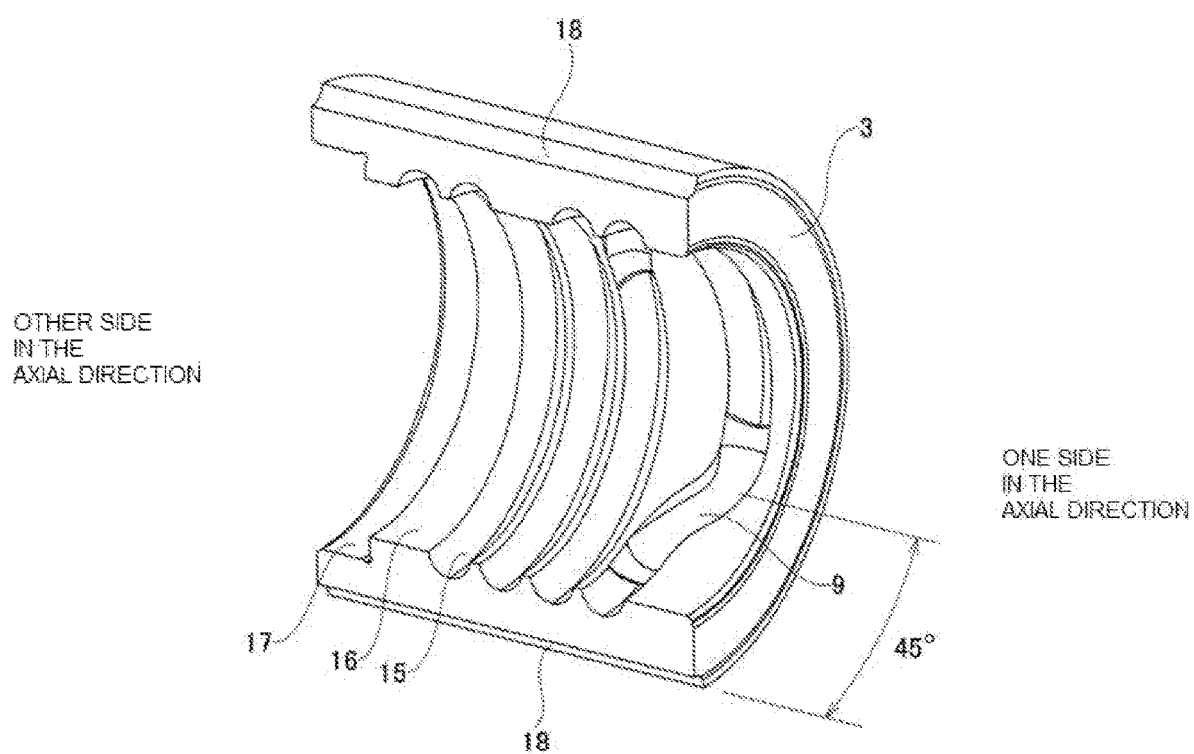
FIG. 5 is a cross-sectional perspective view of a nut of the ball screw device according to the first example.
Figure 7:
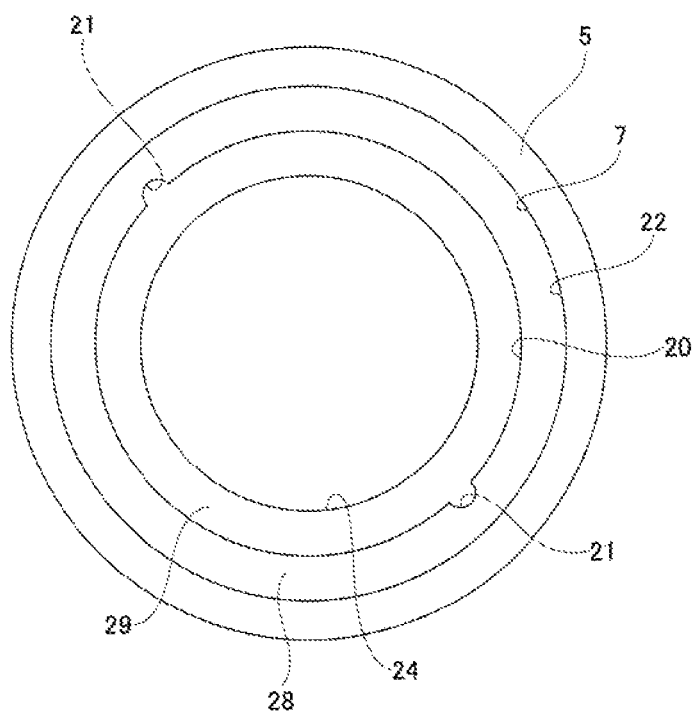
FIG. 7 is an end view of the housing of the ball screw device according to the first example, as viewed from one side in the axial direction.

As illustrated in FIG. 3 and FIG. 7, the nut insertion portion 20 has, on the inner-circumferential surface, a retaining concave groove 21 that can be engaged with the rotation restraining member 6 in the circumferential direction. The retaining concave grooves 21 are provided at locations in the circumferential direction (in this example, two locations) on the inner-circumferential surface of the nut insertion portion 20.

The retaining concave groove 21 is a concave groove extending in the axial direction, and is provided over the entire length of the nut insertion portion 20. The center axis of the retaining concave groove 21 is arranged so as to be parallel to the center axis of the nut insertion portion 20. The dimension in the axial direction of the retaining concave groove 21 is slightly larger than the dimension in the axial direction of the rotation restraining member 6.

The retaining concave groove 21 has a cross-sectional shape that can be engaged with the outside portion in the radial direction of the rotation restraining member 6 in the circumferential direction. In this example, since the rotation restraining member 6 is configured in a columnar shape, as illustrated in FIG. 8, the cross-sectional shape of the retaining concave groove 21 with respect to a virtual plane perpendicular to the center axis of the nut 3 is arc-shaped. Specifically, the cross-sectional shape of the retaining concave groove 21 is a semicircular arc with a center angle of approximately 180 degrees. Therefore, the width in the circumferential direction of the retaining concave groove 21 (width in the left-right direction in FIG. 8) becomes larger toward inside in the radial direction. The retaining concave groove 21 has a radius of curvature approximately the same as the guide concave groove 18 provided on the outer-circumferential surface of the nut 3. The opening width in the circumferential direction of the retaining concave groove 21 on the inner-circumferential surface of the nut insertion portion 20 is approximately the same as the diameter D of the rotation restraining member 6.

The retaining concave grooves 21 are arranged on the inner-circumferential surface of the nut insertion portion 20 so as to be uniformly spaced in the circumferential direction. In this example, since two retaining concave grooves 21 are provided, the two retaining concave grooves 21 are arranged at positions 180 degrees out of phase. Further, in the assembled state of the ball screw device 1, the retaining concave grooves 21 and the guide concave grooves 18 are arranged at the same positions in the circumferential direction. As a result, the retaining concave grooves 21 and the guide concave grooves 18 are arranged so as to face each other in the radial direction.

The insertion hole 7 has a fixing hole portion 22 having a diameter larger than that of the nut insertion portion 20 on a portion on the one side in the axial direction that is closer to the one side in the axial direction than the nut insertion portion 20. The fixing hole portion 22 has a locking concave groove 23 in a portion in the axial direction of the inner-circumferential surface. A retaining ring (not illustrated) is engaged with the locking concave groove 23 to prevent the rolling bearing 30 from coming off the fixing hole portion 22 to the one side in the axial direction.

The insertion hole 7 has a cylinder hole portion 24 having a diameter smaller than that of the nut insertion portion 20 on a portion on the other side in the axial direction located on the other side in the axial direction of the nut insertion portion 20. The cylinder hole portion 24 has an inner diameter slightly larger than the outer diameter of the piston 35. The dimensional difference between the inner diameter of the cylinder hole portion 24 and the outer diameter of the piston 35 is smaller than the dimensional difference between the inner diameter of the nut insertion portion 20 and the outer diameter of the nut 3. In the illustrated example, the cylinder hole portion 24 has an inner diameter approximately the same as that of the large-diameter surface portion 17 forming the inner-circumferential surface of the nut 3. A plurality of (two in the illustrated example) seal concave grooves 25a, 25b are provided on the one side in the axial direction of the inner-circumferential surface of the cylinder hole portion 24. The seal concave grooves 25a, 25b respectively have an annular shape. O-rings 26a, 26b for sealing between the inner-circumferential surface of the cylinder hole portion 24 and the outer-circumferential surface of the piston 35 are mounted in the seal concave grooves 25a, 25b. The cylinder hole portion 24 has a circular bottom surface 27 at the end portion on the other side in the axial direction. Therefore, the cylinder hole portion 24 is open only on the one side in the axial direction.

The insertion hole 7 has a large-diameter stepped surface 28 facing the one side in the axial direction between the nut insertion portion 20 and the fixing hole portion 22, and has a small-diameter stepped surface 29 facing the one side in the axial direction between the nut insertion portion 20 and the cylinder hole portion 24. That is, the end portion on the one side in the axial direction of the nut insertion portion 20 and the end portion on the other side in the axial direction of the fixing hole portion 22 are connected through the large-diameter stepped surface 28, and the end portion on the other side in the axial direction of the nut insertion portion 20 and the end portion on the one side in the axial direction of the cylinder hole portion 24 are connected through the small-diameter stepped surface 29. The large-diameter stepped surface 28 and the small-diameter stepped surface 29 are respectively configured by an annular flat surface that exists on a virtual plane perpendicular to the center axis of the insertion hole 7.

In this example, the housing 5 is configured in a cylindrical shape with a bottom. However, in a case of implementing the present invention, the shape of the housing can be changed as appropriate. Further, in this example, the housing 5 is configured to have only the insertion hole 7 inside. However, in a case of implementing the present invention, it is also possible to provide a motor accommodating portion for accommodating a motor, a gear accommodating portion for accommodating a gear, etc. inside the housing.

The ball screw device 1 of this example further includes a rolling bearing 30 for supporting the screw shaft 2 with respect to the housing 5 so as to be able to freely rotate and supporting the rotation restraining member 6 with respect to the housing 5.

[Rolling Bearing]

The rolling bearing 30 has an annular shape and is fitted and fixed inside the housing 5. The rolling bearing 30 has an annular outer ring 31 having an outer ring raceway 31a on the inner-circumferential surface, an annular inner ring 32 having an inner ring raceway 32a on the outer-circumferential surface, rolling bodies (balls) 33 arranged between the outer ring raceway 31a and the inner ring raceway 32a so as to be able to roll freely, and a cage 34 that holds the rolling bodies 33 so as to be uniformly spaced in the circumferential direction.

Figure 2:
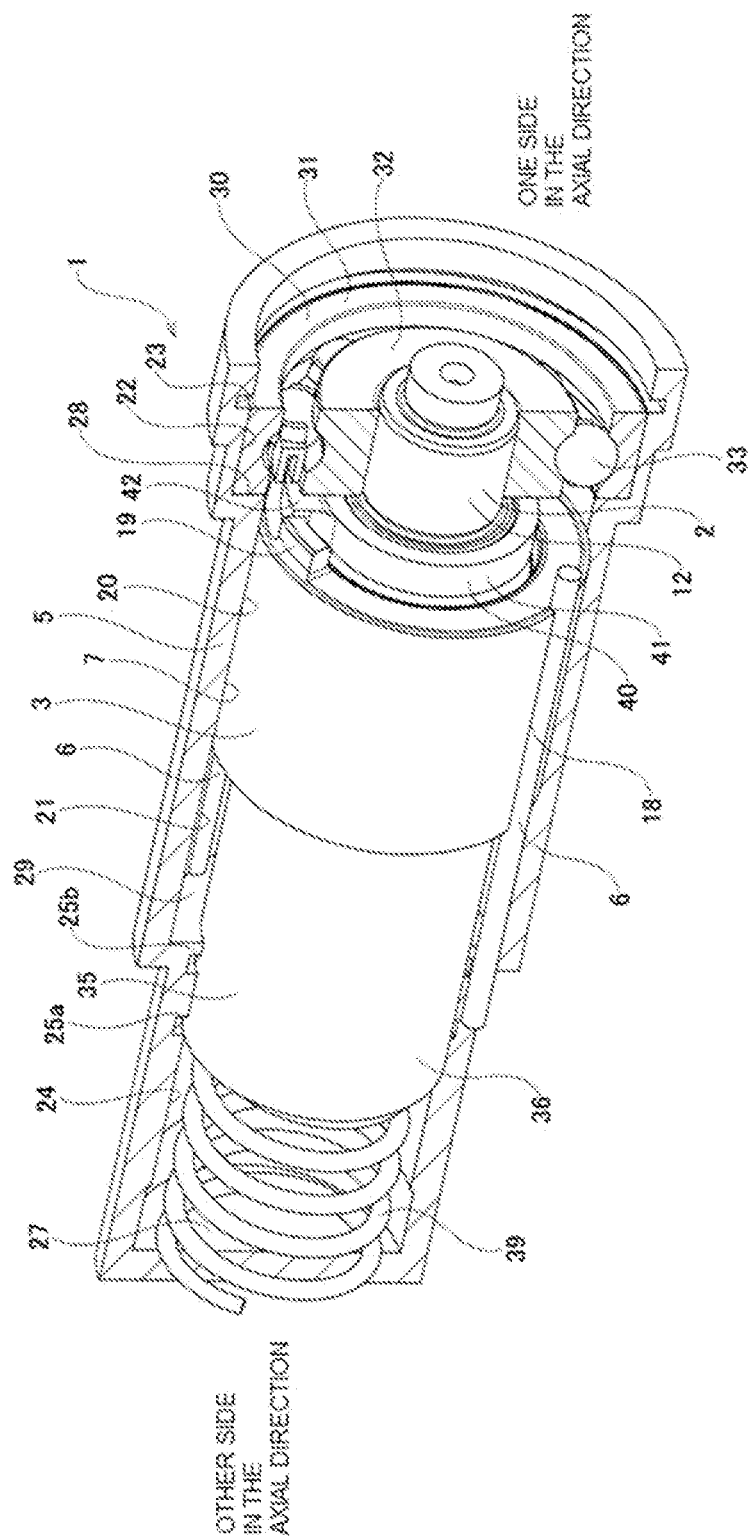
FIG. 2 is a partial cross-sectional perspective view of the ball screw device according to the first example.

In this example, the outer ring 31 of the rolling bearing 30 is fitted inside the fixing hole portion 22 of the insertion hole 7 by a loose fit or a press fit. A retaining ring (not illustrated) is engaged with the locking concave groove 23 formed on the inner-circumferential surface of the fixing hole portion 22 to prevent the rolling bearing 30 from coming off the fixing hole portion 22 to the one side in the axial direction. In this state, the side surface on the other side in the axial direction of the outer ring 31 is abutted against the large-diameter stepped surface 28 provided on the inner-circumferential surface of the insertion hole 7. Due to this, the opening portion on the one side in the axial direction of the retaining concave groove 21 is closed by the side surface on the other side in the axial direction of the outer ring 31. Therefore, of the side surface on the other side in the axial direction of the outer ring 31, the portion whose phase in the circumferential direction matches the retaining concave groove 21 faces the small-diameter stepped surface 29 in the axial direction. In the example of FIG. 2, although the inner diameter of the outer ring 31 is approximately the same as the inner diameter of the large-diameter stepped surface 28, it is also possible to make the inner diameter of the outer ring smaller than the inner diameter of the large-diameter stepped surface so that the radially inner portion of the side surface on the other side in the axial direction of the outer ring protrudes toward inside in the radial direction from the large-diameter stepped surface, and to make the inner diameter of the outer ring larger than the inner diameter of the large-diameter stepped surface as long as the opening portion on the one side in the axial direction of the retaining concave groove can be closed by the side surface on the other side in the axial direction of the outer ring.

By press-fitting the inner ring 32 of the rolling bearing 30 onto the second fitting shaft portion 12 provided on the screw shaft 2, the inner ring 32 is externally fitted and fixed to the second fitting shaft portion 12 so as not to be able to rotate relative to the second fitting shaft portion 12. In this example, with such a configuration, the screw shaft 2 is supported so as to be able to freely rotate with respect to the housing 5.

[Rotation Restraining Member]

The rotation restraining member 6 is a member for preventing relative rotation of the nut 3 with respect to the housing 5, and is configured by a shaft-shaped member extending in the axial direction. In this example, the rotation restraining member 6 is made of metal such as ferrous alloy and have a columnar shape. The rotation restraining member 6 has a circular cross-sectional shape. The rotation restraining member 6 has a dimension in the axial direction slightly smaller than the dimension in the axial direction of the nut insertion portion 20 of the insertion hole 7.

The rotation restraining member 6 is arranged so as to be held in the radial direction between the guide concave groove 18 provided on the outer-circumferential surface of the nut 3 and the retaining concave groove 21 provided on the inner-circumferential surface of the nut insertion portion 20 in a state in which the center axis of the rotation restraining member 6 is arranged so as to be parallel to the center axis of the insertion hole 7. In other words, the rotation restraining member 6 is arranged so as to span the guide concave groove 18 and the retaining concave groove 21. In this example, two rotation restraining members 6 are provided in the same number as the guide concave grooves 18 and the retaining concave grooves 21. The two rotation restraining members 6 are arranged on opposite sides in the diametrical direction of the nut insertion portion 20.

The outside portion in the radial direction of the rotation restraining member 6 (the upper portion in FIG. 8) is arranged inside the retaining concave groove 21 and engage with the retaining concave groove 21 in the circumferential direction. Further, as illustrated in FIG. 1, the rotation restraining member 6 is held in the axial direction between the side surface on the other side in the axial direction of the outer ring 31 of the rolling bearing 30 and the small-diameter stepped surface 29. In other words, the end surface on the one side in the axial direction of the rotation restraining member 6 faces the side surface on the other side in the axial direction of the outer ring 31 in the axial direction, and the end surface on the other side in the axial direction of the rotation restraining member 6 faces the small-diameter stepped surface 29 in the axial direction. Due to this, the rotation restraining member 6 is prevented from coming off in the axial direction by the side surface on the other side in the axial direction of the outer ring 31 and the small-diameter stepped surface 29.

In this example, the dimension in the axial direction of the rotation restraining member 6 is set to be slightly smaller than the dimension in the axial direction from the side surface on the other side in the axial direction of the outer ring 31 to the small-diameter stepped surface 29, that is, the dimension in the axial direction of the nut insertion portion 20. As a result, a gap is provided between the end surface on the one side in the axial direction of the rotation restraining member 6 and the side surface on the other side in the axial direction of the outer ring 31 that axially faces the end surface on the one side in the axial direction, and/or between the end surface on the other side in the axial direction of the rotation restraining member 6 and the small-diameter stepped surface 29 that axially faces the end surfaces on the other side in the axial direction.

Therefore, the rotation restraining member 6 is not supported and fixed to the housing 5 by being held between the side surface on the other side in the axial direction of the outer ring 31 and the small-diameter stepped surface 29 from both sides in the axial direction, but the rotation restraining member 6 is only held between the guide concave groove 18 and the retaining concave groove 21 in the radial direction. The rotation restraining member 6 is held between the guide concave grooves 18 and the retaining concave grooves 21 with slight a gap in the radial direction.

The inside portion in the radial direction of the rotation restraining member 6 (the lower side portion in FIG. 8) is arranged inside the guide concave groove 18 so as to engage with the guide concave groove 18 in the circumferential direction. Further, the inside portion in the radial direction of the rotation restraining member 6 is arranged so as to be able to relatively slide in the axial direction with respect to the guide concave groove 18.

The ball screw device 1 is assembled by, for example, arranging the rotation restraining member 6 coated with grease inside the retaining concave groove 21 to attach the rotation restraining member 6 to the retaining concave groove 21, and then inserting the nut 3 into the nut insertion portion 20 in a state where the guide concave groove 18 provided on the outer-circumferential surface of the nut 3 and the rotation restraining member 6 (retaining concave groove 21) are in phase with each other. As a result, the rotation restraining member 6 can be easily arranged between the guide concave groove 18 and the retaining concave groove 21.

The ball screw device 1 of this example includes a piston 35 fixed to the nut 3 and linearly moving together with the nut 3.

[Piston]

The piston 35 is made of metal and has a cylindrical shape. The piston is fitted and fixed inside the nut 3. The piston 35 is arranged coaxially with the nut 3. The piston 35 is arranged so as to span between the cylinder hole portion 24 and the nut insertion portion 20, and the portion on the other side in the axial direction of the piston 35 is fitted in the cylinder hole portion 24 so as to be able to move in the axial direction. The piston 35 has a cylindrical portion 36 and a partition wall portion 37 that partitions the internal space of the cylindrical portion 36.

The cylindrical portion 36 has an inner diameter approximately the same as the small-diameter surface portion 16 of the nut 3 and an outer diameter slightly larger than the inner diameter of the large-diameter surface portion 17 of the nut 3. The inner diameter of the cylindrical portion 36 is larger than the outer diameter of the screw portion 10 of the screw shaft 2. The cylindrical portion 36 has a constant inner diameter and outer diameter along the axial direction.

The end portion on the one side in the axial direction of the cylindrical portion 36 is internally fitted and fixed to the large-diameter surface portion 17 of the nut 3 by press-fitting. Of the space 38a, 38b inside the cylindrical portion 36, the portion on the other side in the axial direction of the screw portion 10 can be inserted into the space 38a on the one side in the axial direction of the partition wall portion 37, and a portion on the one side in the axial direction of a coil spring 39 is arranged in the space 38b on the other side in the axial direction of the partition wall portion 37. The coil spring 39 is elastically held between the side surface on the other side in the axial direction of the partition wall portion 37 and the bottom surface 27 of the cylinder hole portion 24. The coil spring 39 has a role of pressing the piston 35 toward the one side in the axial direction and returning the piston and the nut 3 to a predetermined position (for example, initial position). In this example, the end portion on the one side in the axial direction of the cylindrical portion 36 of the piston 35 is internally fitted and fixed to the end portion on the other side in the axial direction of the nut 3. However, in a case of implementing the present invention, it is also possible to adopt a configuration in which the end portion on the one side in the axial direction of the cylindrical portion of the piston is externally fitted and fixed to a small-diameter portion having an outer diameter smaller than that of the portion adjacent to the one side in the axial direction, which is provided at the end portion on the other side in the axial direction of the nut.

The ball screw device 1 of this example further includes a stopper for regulating the stroke end of the nut 3.

[Stopper]

The stopper 40 has a boss portion 41 having an annular shape and a rotating side engaging portion (claw portion) 42 having a projection shape.

The boss portion 41 is externally fitted to the fitting shaft portion 11 of the screw shaft 2 so as not to be able to rotate relative to the fitting shaft portion 11. The boss portion 41 has an engaging hole 43 in the central portion in the radial direction, through which the first fitting shaft portion 11 can be inserted in the axial direction. In this example, the engaging hole 43 is a spline hole having female spline teeth 44 formed on the inner-circumferential surface. The boss portion 41 is externally fitted to the first fitting shaft portion 11 so as not to be able to rotate relative to the fitting shaft portion 11 by spline-engaging female spline teeth 44 formed on the inner-circumferential surface of the engaging hole 43 with the male spline teeth 14 formed on the outer-circumferential surface of the first fitting shaft portion 11. When the first fitting shaft portion 11 is a serration shaft portion, the engaging hole 43 is a serration hole having female serration teeth formed on the inner-circumferential surface.

The boss portion 41 has an outer-circumferential surface having a cylindrical surface shape. The rotating side engaging portion 42 is provided on a portion in the circumferential direction of the outer-circumferential surface of the boss portion 41, and protrudes toward outside in the radial direction.

[Explanation of the Operation of the Ball Screw Device]

In the ball screw device 1 of this example, when the screw shaft 2 is rotationally driven by the driving source (not illustrated), the nut 3, whose relative rotation with respect to the housing 5 is prevented by the rotation restraining member 6, linearly moves inside the insertion hole 7 together with the piston 35. Specifically, the nut 3 linearly moves inside the nut insertion portion 20 of the insertion hole 7, and the piston 35 linearly moves inside the cylinder hole portion 24 and the nut insertion portion 20 of the insertion hole 7. As a result, the liquid or gas filled inside the cylinder hole portion 24 is discharged or sucked through, for example, a communication hole (not illustrated) formed in the bottom surface 27. When linearly moving the nut 3 and the piston 35, the coil spring 39 is elastically deformed.

When the nut 3 moves relative to the screw shaft 2 to the one side in the axial direction and reaches the stroke end, the non-rotating side engaging portion 19 provided on the nut 3 and the rotating side engaging portion 42 provided on the stopper 40 are engaged in the circumferential direction. Due to this, rotation of the screw shaft 2 is prevented. Thus, in the ball screw device 1 of this example, the stopper 40 can regulate the stroke end associated with the relative movement of the nut 3 to the one side in the axial direction with respect to the screw shaft 2. The stroke end associated with the relative movement of the nut 3 to the other side in the axial direction with respect to the screw shaft 2 may be regulated by abutting the end surface on the other side in the axial direction of the nut 3 against the small-diameter stepped surface 29 of the housing 5. Alternatively, various conventionally known stroke limiting mechanisms can be used for the regulation.

With the ball screw device 1 of this example, the nut 3, which is a linear motion element, can be prevented from rotating at low cost.

In this example, the rotation restraining member 6 for preventing the nut 3 from rotating relative to the housing 5 is configured separately from the housing 5 instead of being configured integrally with the housing 5. As a result, the shape accuracy of the rotation restraining member 6 can be improved at low cost. Accordingly, with the ball screw device 1 of this example, the nut 3 can be prevented from rotating at low cost.

In this example, the rotation restraining member 6 is held between the guide concave groove 18 and the retaining concave groove 21 in the radial direction without being supported and fixed to the housing 5. As a result, parts for supporting and fixing the rotation restraining member 6 to the housing 5 become unnecessary, so that further cost reduction can be achieved. Further, since it is not necessary to regulate the dimensional accuracy of the dimension in the axial direction of the rotation restraining member 6 with high precision, cost reduction can be achieved.

The operation of arranging the rotation restraining member 6 between the guide concave groove 18 and the retaining concave groove 21 includes arranging the rotation restraining member 6 coated with grease inside the retaining concave groove 21, and inserting the nut 3 into the nut insertion portion 20 in a state where the rotation restraining member 6 is attached to the retaining concave groove 21. Therefore, the operation of installing the rotation restraining member 6 can be easily performed.

In this example, the guide concave groove 18 is arranged so as to be shifted in the circumferential direction from all of the circulation grooves 9 provided on the inner-circumferential surface of the nut 3. Specifically, when the nut 3 is viewed from the axial direction, each of the two guide concave grooves 18 is arranged so as to be shifted by the same angle (45 degrees each in this example) to opposite sides in the circumferential direction from the two circulation grooves 9 adjacent to each other in the circumferential direction. Therefore, it is possible to suppress deterioration in the strength of the nut 3 due to the formation of the guide concave groove 18. Accordingly, the outer diameter of the nut 3 does not have to be unnecessarily increased, and the ball screw device 1 can be prevented from becoming large.

In this example, since the outer diameter of the nut 3 is made close to the inner diameter of the nut insertion portion 20 and the outer diameter of the nut 3 is made slightly smaller than the inner diameter of the nut insertion portion 20, the margin in the radial direction between the guide concave groove 18 provided on the outer-circumferential surface of the nut 3 and the inside portion in the radial direction of the rotation restraining member 6 can be increased. However, even in this case, the rotation restraining member 6 is held between the guide concave groove 18 and the retaining concave groove 21 with a slight gap in the radial direction. Therefore, the center of the nut 3 can be prevented from being affected by the presence of the rotation restraining member 6.

In a case of implementing the present invention, it is also possible to adopt a configuration in which the rotation restraining member is supported and fixed to the housing by holding the rotation restraining member from both sides in the axial direction between the rolling bearing fixed to the housing so as not to be able to relatively displace in the axial direction and the small-diameter stepped surface provided on the inner-circumferential surface of the housing. That is, by stretching the rotation restraining member in the axial direction between the rolling bearing and the small-diameter stepped surface, the rotation restraining member can be supported and fixed to the housing. In this case, relative rotation of the nut with respect to the housing can be more reliably prevented. Further, as a member (surface) for holding the rotation restraining member from both sides in the axial direction, it is also possible to use other members such as a screw cylinder, a spacer, and a sealing member other than a rolling bearing, and other surfaces other than a stepped surface of the housing.

Second Example

Figure 9:
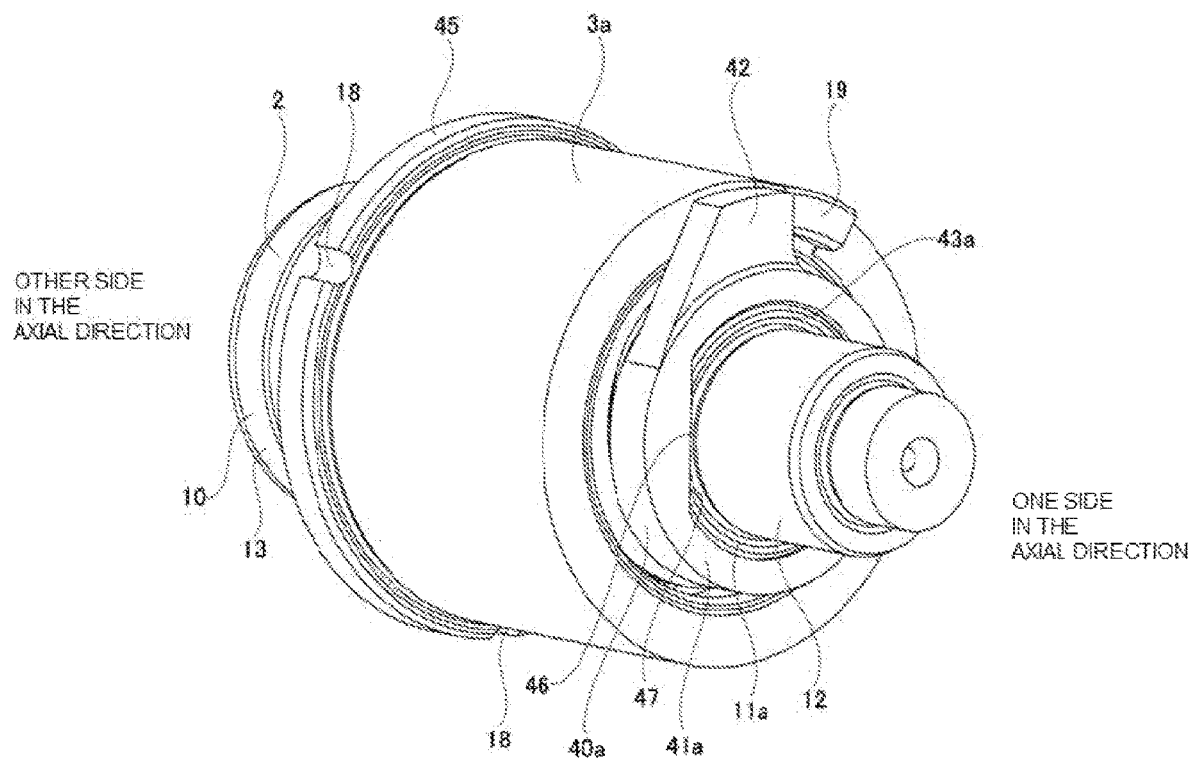
FIG. 9 is a view corresponding to FIG. 4, illustrating a second example of an embodiment of the present invention.

FIG. 9 shows a second example of an embodiment of the present invention.

In this example, an outward flange portion 45 protruding toward outside in the radial direction is provided at the end portion on the other side in the axial direction of the outer-circumferential surface of the nut 3a. Further, the outward flange portion 45 is provided with a guide concave groove 18 that can be engaged with the rotation restraining member 6 (see FIG. 1, etc.) in the circumferential direction. In this example, the guide concave groove 18 is provided only on the outer-circumferential surface of the outward flange portion 45 of the outer-circumferential surface of the nut 3a. The guide concave grooves 18 are arranged on the outer-circumferential surface of the outward flange portion 45 so as to be uniformly spaced in the circumferential direction.

In this example, the construction of fixing the boss portion 41a of the stopper 40a to the first fitting shaft portion 11 of the screw shaft 2a is changed from the construction of the first example.

Specifically, the first fitting shaft portion 11a is made to be a width across flat shape having an elliptical cross section (racetrack oval shape) and a pair of flat outer surfaces parallel to each other on the outer-circumferential surface. Further, the engaging hole 43a of the boss portion 41a is an oblong hole (racetrack oval shaped hole) having a width across flat shape with a pair of flat inner surfaces 47 parallel to each other on the inner-circumferential surface.

In this example, in a state where the first fitting shaft portion 11a of the screw shaft 2 is loosely inserted inside the engaging hole 43a of the stopper 40a, each of the pair of flat inner surfaces 47 provided on the inner-circumferential surface of the engaging hole 43a and each of the pair of flat outer surfaces 46 provided on the outer-circumferential surface of the first fitting shaft portion 11a are engaged (brought into surface contact). As a result, the stopper 40a is non-circularly fitted to the first fitting shaft portion 11a so as not to be able to rotate relative to the first fitting shaft portion 11a. The boss portion 41a of the stopper 40a can be non-circularly fitted to the first fitting shaft portion with the press-fit state.

In this example, the dimension in the axial direction of the guide concave groove 18 can be made shorter than that of the construction of the first example. As a result, the number of man-hours for processing the guide concave groove 18 can be reduced. Therefore, the manufacturing cost of the ball screw device 1 (see FIG. 1, etc.) can be reduced. Further, since the outer diameter of the nut 3*a* can be reduced at the portion deviated in the axial direction from the outward flange portion 45, the ball screw device 1 can also be more compact.

Further, the outer surface shape of the first fitting shaft portion 11*a* and the inner surface shape of the engaging hole 43*a* can be simplified compared to the case of forming spline teeth. As a result, the processing cost can be reduced, and the manufacturing cost can be reduced. Further, compared to the construction of the first example, the fitting length between the first fitting shaft portion 11*a* and the engaging hole 43*a* can be easily secured, so that the thickness in the axial direction of the stopper 40*a* can be reduced. Therefore, the dimension in the axial direction of the ball screw device 1 can be reduced.

Other configurations and operational effects of the second example are the same as in the first example.

Third Example

Figure 10:
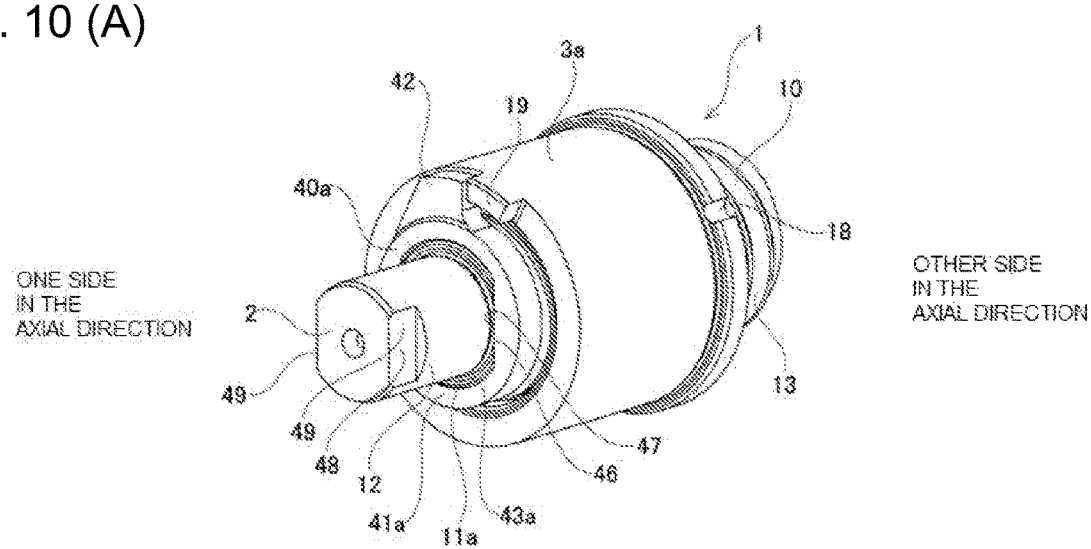
FIG. 10(A) is a view corresponding to FIG. 4, illustrating a ball screw device according to a third example of an embodiment of the present invention.
FIG. 10(B) is a view corresponding to FIG. 4, illustrating a modification of the third example.
Figure 10:
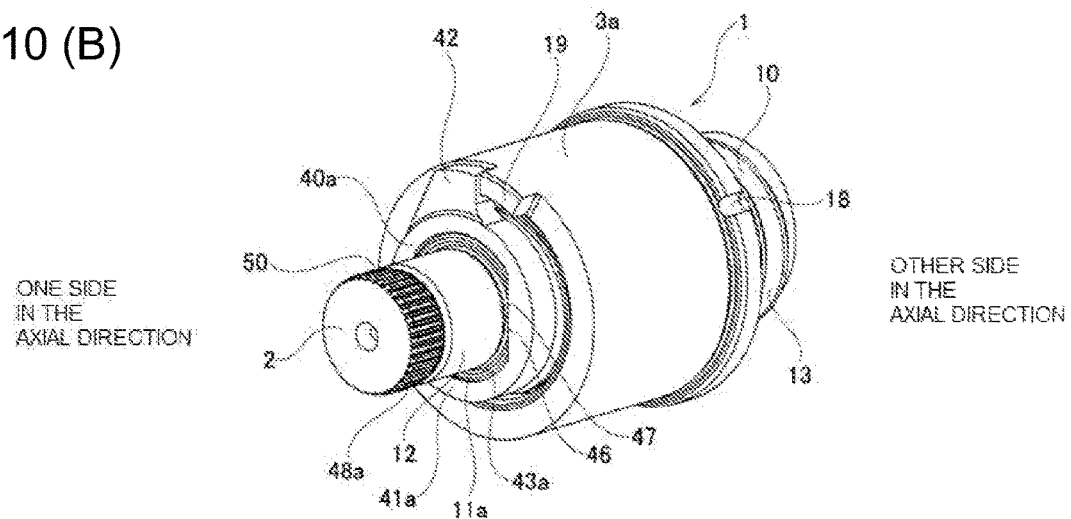

FIG. 10(A) and FIG. 10(B) show a third example of an embodiment of the present invention and a modification of the third example.

In this example, a fixing portion 48, 48*a* for fixing a driving member (not illustrated) such as a gear or a pulley for rotationally driving the screw shaft 2 so as not to be able to rotate relative to each other are provided at the end portion on the one side in the axial direction of the second fitting shaft portion 12 of the screw shaft 2.

In the structure illustrated in FIG. 10(A), a fixing portion 48 having a width across flat shape is provided at the end portion on the one side in the axial direction of the second fitting shaft portion 12. The fixing portion 48 has an elliptical cross section and a pair of flat outer surfaces 49 parallel to each other on the outer-circumferential surface.

In the structure of a modification illustrated in FIG. 10(B), a gear-shaped fixing portion 48*a* is provided at the end portion on the one side in the axial direction of the second fitting shaft portion 12. The fixing portion 48*a* is a spline shaft portion having spline teeth 50 on the outer-circumferential surface.

In either structure of this example, the driving member (not illustrated) can be fixed to the screw shaft 2 by using the fixing portion 48, 48*a* so as not to be able to rotate relative to the screw shaft 2.

Other configurations and operational effects of the third example are the same as in the first example and the second example.

Fourth Example

Figure 11:
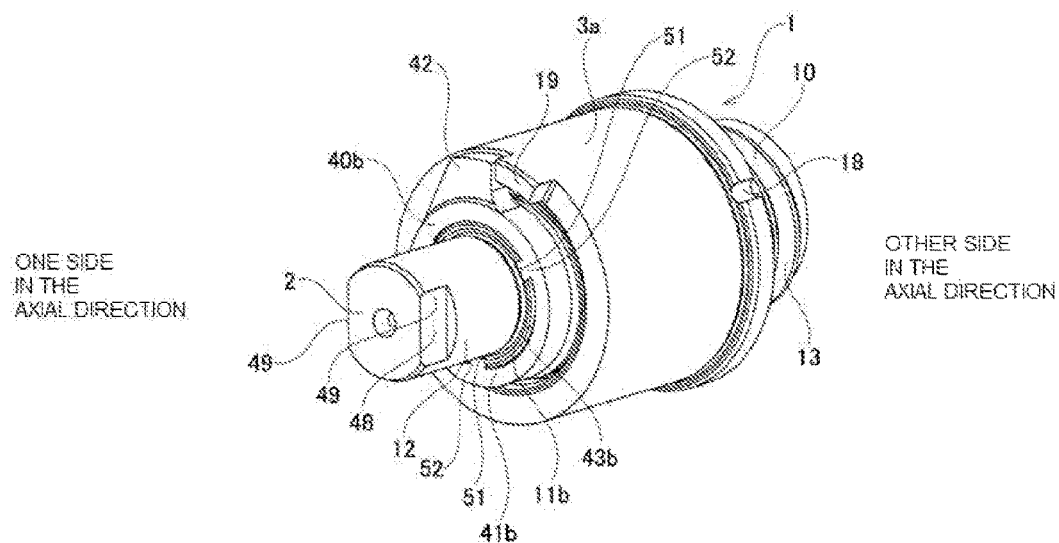
FIG. 11(A) is a view corresponding to FIG. 4, illustrating a ball screw device according to a fourth example of an embodiment of the present invention.
FIG. 11(B) is a view corresponding to FIG. 4, illustrating a modification of the fourth example.
Figure 11:
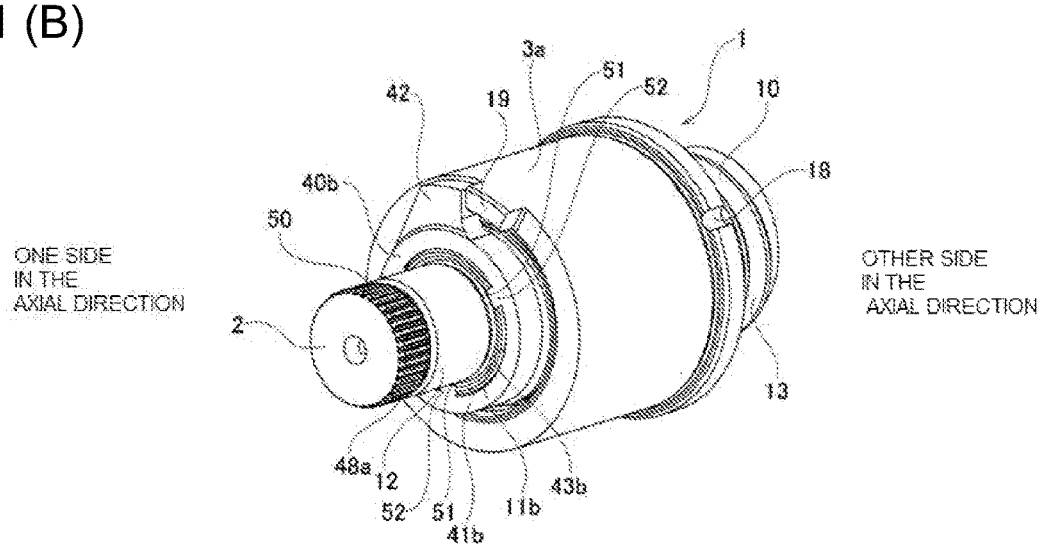

FIG. 11(A) and FIG. 11(B) show a fourth example of an embodiment of the present invention.

In this example, the fixing structure of the boss portion 41*b* of the stopper 40*b* to the first fitting shaft portion 11*b* of the screw shaft 2*b* is made different from the structures of the first example to the third example.

Specifically, the first fitting shaft portion 11*b* is configured by forming engaging concave grooves 51 each extending in the axial direction at a plurality of locations in the circumferential direction (three locations in the illustrated example) on the outer-circumferential surface having a cylindrical surface shape. The plurality of engaging concave grooves 51 are arranged so as to be uniformly spaced in the circumferential direction.

Further, the engaging hole 43*b* of the boss portion 41*b* is configured by forming engaging claw portions 52 each protruding toward inside in the radial direction at a plurality of locations in the circumferential direction (three locations in the illustrated example) on the inner-circumferential surface having a cylindrical surface shape. The plurality of engaging claw portions 52 are arranged so as to be uniformly spaced in the circumferential direction.

In this example, in a state where the first fitting shaft portion 11*b* of the screw shaft 2 is loosely inserted inside the engaging hole 43*b* of the boss portion 41*b*, the plurality of engaging claw portions 52 is engaged (key-engaged) with the plurality of engaging concave grooves 51. As a result, the stopper 40*b* is non-circularly fitted to the first fitting shaft portion 11*b* so as not to be able to relatively rotate. The boss portion 41*b* of the stopper 40*b* may be non-circularly fitted to the first fitting shaft portion 11*b* by press-fitting.

In this example as well, the screw shaft 2 further includes fixing portion 48, 48*a* on the one side in the axial direction of the second fitting shaft portion 12 for fixing a driving member (not illustrated) so as not to be able to relatively rotate.

In the structure illustrated in FIG. 11(A), a fixing portion 48 having a width across flat shape is provided at the end portion on the one side in the axial direction of the second fitting shaft portion 12. The fixing portion 48 has an elliptical cross section and has a pair of flat outer surfaces 49 parallel to each other on the outer-circumferential surface. In the structure of a modification illustrated in FIG. 11(B), a gear-shaped fixing portion 48*a* is provided at the end portion on the one side in the axial direction of the second fitting shaft portion 12. The fixing portion 48*a* is a spline shaft portion having spline teeth 50 on the outer-circumferential surface. In either structure, the driving member (not illustrated) can be fixed to the screw shaft 2 by using the fixing portion 48, 48*a* so as not to be able to rotate relative to the screw shaft 2.

In this example, since torque can be transmitted between the stopper 40*b* and the first fitting shaft portion 11*b* by using a plurality of engaging portions between the engaging claw portions 52 and the engaging concave grooves 51, allowable torque can be increased compared to the construction of the third example. Further, since the outer surface shape of the first fitting shaft portion 11*b* and the inner surface shape of the engaging hole 43*b* can be simplified compared to a case where spline teeth are formed, the processing cost can be reduced and the manufacturing cost can be reduced.

Other configurations and operational effects of the fourth example are the same as in the first example and the third example.

Fifth Example

Figure 12:
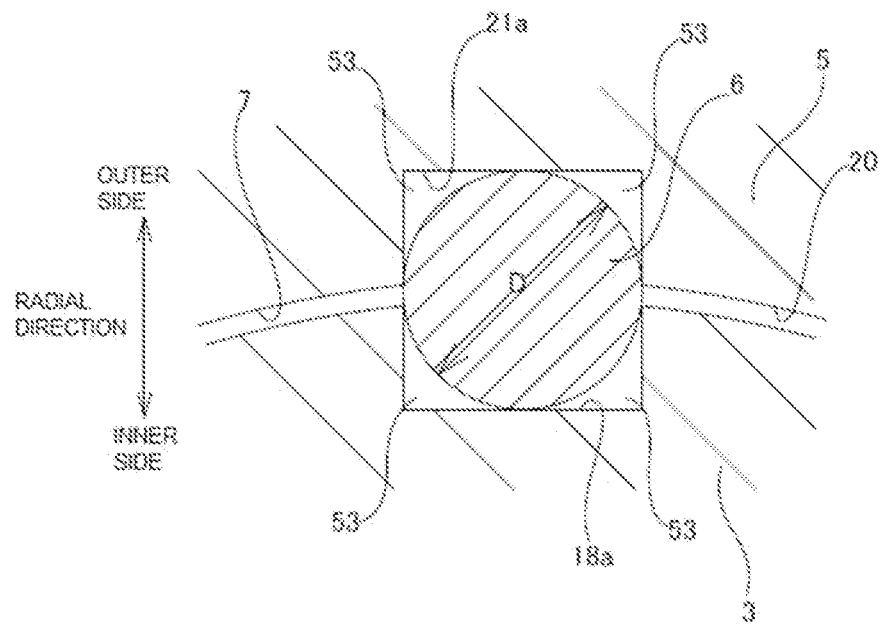
FIG. 12(A) a view corresponding to FIG. 8, illustrating a fifth example of an embodiment of the present invention.
FIG. 12(B) is a view corresponding to FIG. 8, illustrating a sixth example of an embodiment of the present invention.
Figure 12:
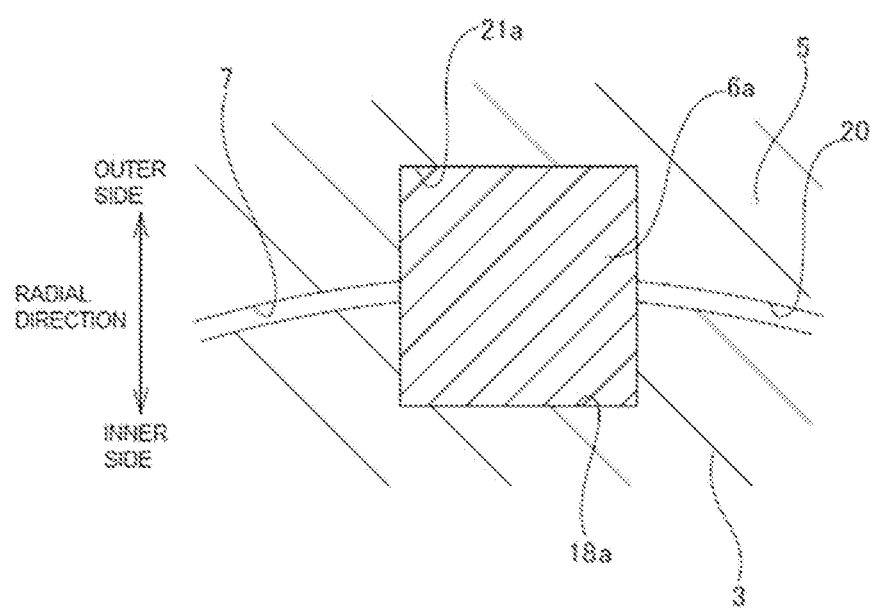

FIG. 12(A) shows a fifth example of an embodiment of the present invention.

In this example, the cross-sectional shape of the guide concave groove 18*a* provided on the outer-circumferential surface of the nut 3 and the cross-sectional shape of the retaining concave groove 21*a* provided on the inner-circumferential surface of the nut insertion portion 20 of the housing 5 are made different from those of the construction of the first example.

Specifically, the cross-sectional shape of the guide concave groove 18*a* with respect to a virtual plane perpendicular to the center axis of the nut 3 is a rectangular shape. That is, the guide concave groove 18*a* is configured by a square groove. As a result, the width in the circumferential direction of the guide concave groove 18a is constant over the radial direction.

The guide concave groove 18a has a groove depth approximately the same as the ½ of the diameter D of the rotation restraining member 6. Further, the opening width in the circumferential direction of the guide concave groove 18a on the outer-circumferential surface of the nut 3 is approximately the same as the diameter D of the rotation restraining member 6.

Further, the cross-sectional shape of the retaining concave groove 21a with respect to a virtual plane perpendicular to the center axis of the insertion hole 7 of the housing 5 is a rectangular shape, and the retaining concave groove 21a is configured by a square groove. The width in the circumferential direction of the retaining concave groove 21a is constant over the radial direction.

The width in the circumferential direction and the groove depth of the retaining concave groove 21a are the same as the width in the circumferential direction and the groove depth of the guide concave groove 18a.

In this example, the guide concave groove 18a and the retaining concave groove 21a can be easily processed using a milling machine. As a result, it is advantageous in reducing the manufacturing cost of the ball screw device 1 (see FIG. 1, etc.). Further, a gap 53 having a substantially triangular cross section can be formed at each corner of the guide concave groove 18a and the retaining concave groove 21a. As a result, a sufficient amount of grease can be held in the gap 53. Therefore, the sliding resistance of the rotation restraining member 6 with respect to the guide concave groove 18a can be reduced.

Other configurations and operational effects of the fifth example are the same as in the first example.

Sixth Example

FIG. 12(B) shows a sixth example of an embodiment of the present invention.

In this example, only the shape of the rotation restraining member 6a is made different from that of the construction of the fifth example.

Specifically, the rotation restraining member 6a is configured in the shape of a quadrangular prism. Further, the inside portion in the radial direction of the rotation restraining member 6a is arranged inside the guide concave groove 18a having a rectangular cross-sectional shape with almost no gap, and the outside portion in the radial direction of the rotation restraining member 6a is arranged inside the retaining concave groove 21a having a rectangular cross-sectional shape with almost no gap. That is, of the circumferential surface of the rotation restraining member 6a, the inside surface in the radial direction comes in surface contact with the bottom surface in the radial direction of the guide concave groove 18a, and the outside surface in the radial direction comes in surface contact with the bottom surface in the radial direction of the retaining concave groove 21a. Further, both side surfaces in the circumferential direction of the rotation restraining member 6a come in surface contact with the side surfaces in the circumferential direction of the guide concave groove 18a and the retaining concave groove 21a.

In this example, the rotation restraining member 6a can be manufactured at low cost. Therefore, it is advantageous in reducing the manufacturing cost of the ball screw device 1. Further, the rotation restraining member 6a can be suppressed from rattling inside the guide concave groove 18a and the retaining concave groove 21a. As a result, the nut 3 can be prevented from rattling in the circumferential direction with respect to the housing 5.

Other configurations and operational effects of the sixth example are the same as in the first example and the fifth example.

Seventh Example

Figure 13:
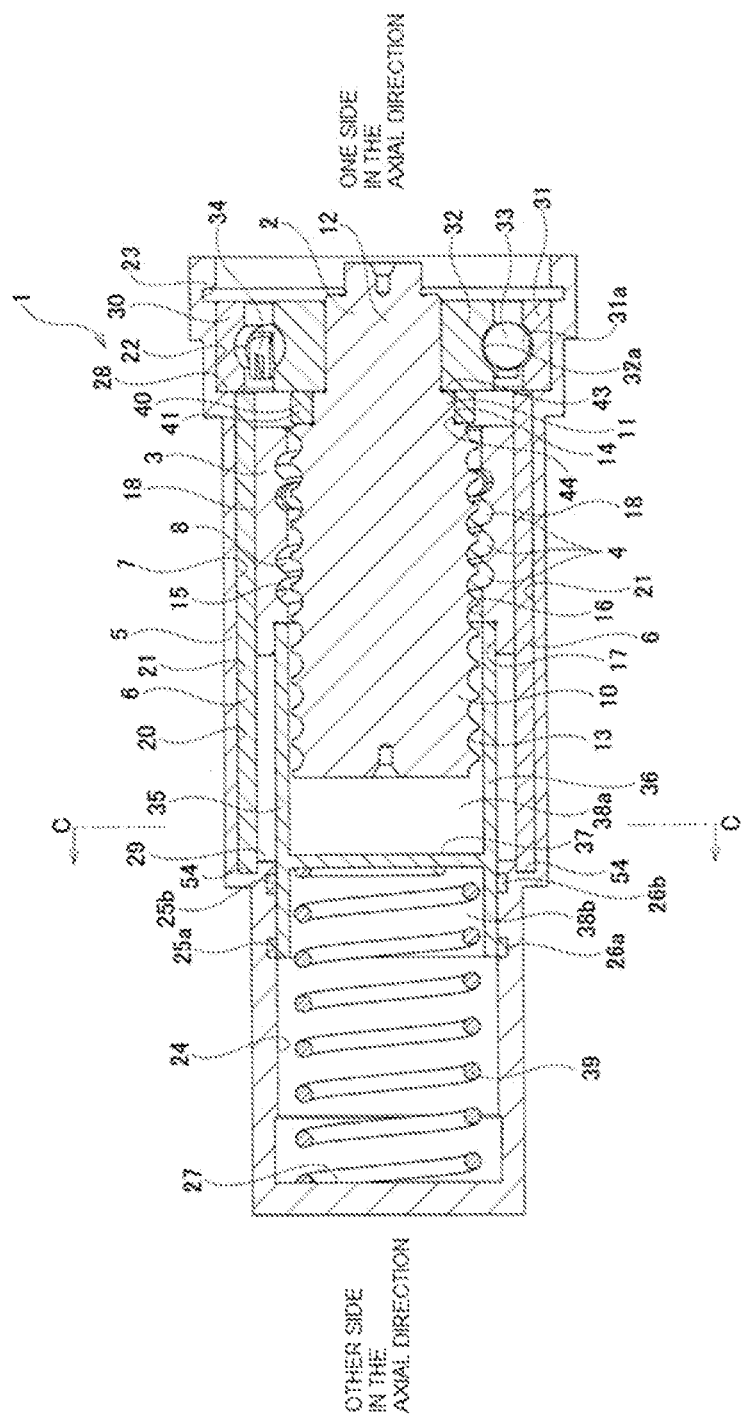
FIG. 13 is a view corresponding to FIG. 1, illustrating a seventh example of an embodiment of the present invention.
Figure 14:
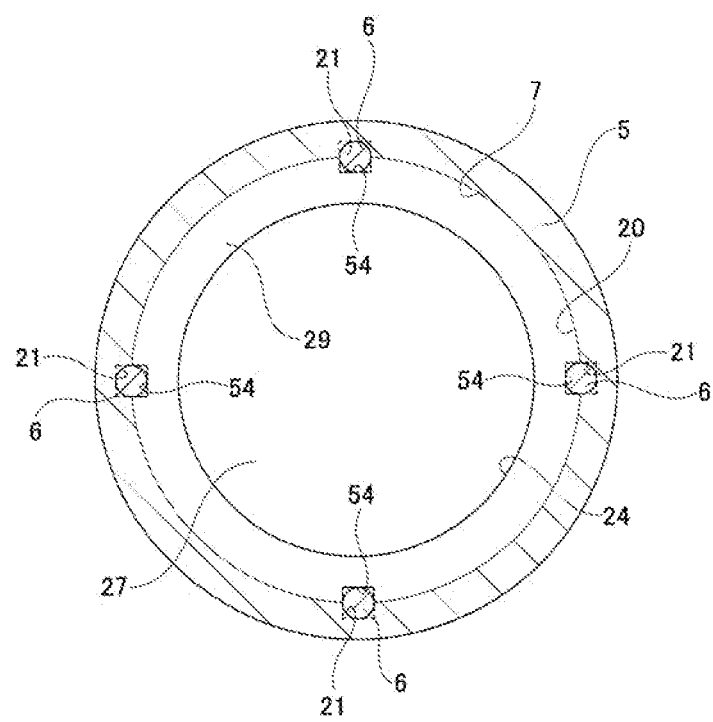
FIG. 14 is a view corresponding to a cross-sectional view of section B-B in FIG. 13, illustrating only the housing and the rotation restraining member.
Figure 15:
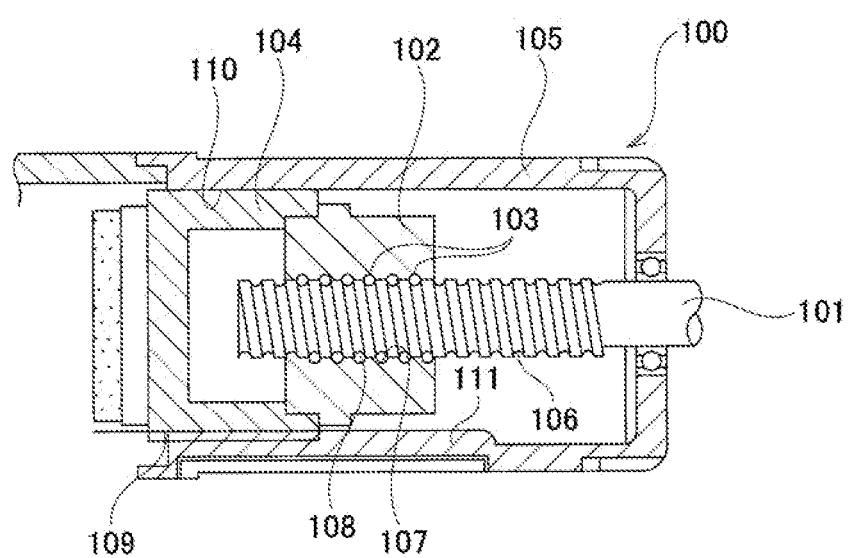
FIG. 15 is a cross-sectional view of a ball screw device having a conventional structure.
Figure 16:
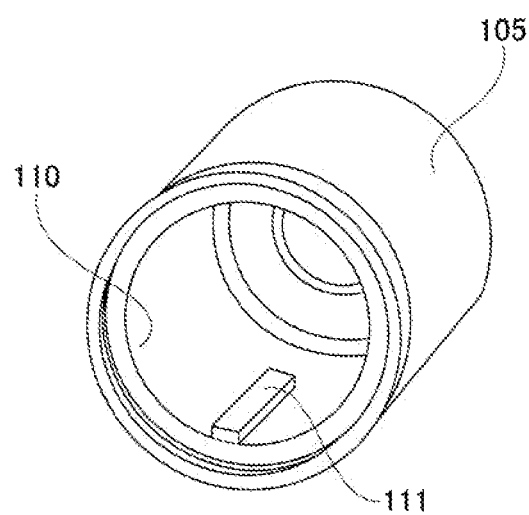
FIG. 16 is a perspective view of a housing of a ball screw device having a conventional structure.

FIG. 13 and FIG. 14 show a seventh example of an embodiment of the present invention.

In this example, an engaging concave portion 54 that can be engaged with the end portion on the other side in the axial direction of the rotation restraining member 6 is provided on the small-diameter stepped surface 29 of the insertion hole 7 of the housing 5. The engaging concave portions 54 are provided at portions where the phase matches with the retaining concave grooves 21. In the illustrated example, since four rotation restraining members 6 and four retaining concave grooves 21 are provided so as to be uniformly spaced in the circumferential direction, four engaging concave portions 54 are provided so as to be uniformly spaced in the circumferential direction. The engaging concave portion 54 has a rectangular shape when viewed from the axial direction. The width dimension in the radial direction and the width in the circumferential direction of the engaging concave portion 54 are slightly larger than the diameter of the rotation restraining member 6.

In this example, when the ball screw device 1 is assembled, the end portion on the other side in the axial direction of the rotation restraining member 6 can be engaged with the engaging concave portion 54 by inserting the end portion on the other side in the axial direction of the rotation restraining member 6 inside the engaging concave portion 54 in the axial direction. As a result, before the nut 3 is inserted inside the nut insertion portion 20, the rotation restraining member 6 can be prevented from coming off from the inside of the retaining concave groove 21 so as to fall toward inside in the radial direction. Accordingly, the workability of assembling the ball screw device 1 can be improved.

Other configurations and operational effects of the seventh example are the same as in the first example.

Although an embodiment of the present invention has been descried above, the present invention is not limited to this and can be appropriately modified within a range that does not deviate from the spirit of the invention. Further, the construction of each example described above may be appropriately combined and implemented as long as there is no contradiction.

In each of the examples described above, the case where the rotation restraining member has a columnar shape or a prismatic shape has been described. However, in a case of implementing the present invention, the rotation restraining member may have a semi-cylindrical shape, a triangular prism shape, or other shapes.

In each of the examples described above, the case where the cross-sectional shapes of the guide concave groove and the retaining concave groove are arc-shaped and rectangular. However, in a case of implementing the present invention, the cross-sectional shapes of the guide concave groove and the retaining concave groove can be suitably changed. Further, the cross-sectional shape of the guide concave groove and the cross-sectional shape of the retaining concave groove can be made different from each other.

In each of the examples described above, the case where two guide concave grooves, retaining concave grooves, and rotation restraining members are provided or the case of providing each of four has been described. However, in a case of implementing the present invention, it is also possible to employ a construction in which one guide concave groove, one retaining concave groove, and one rotation restraining member are provided, and it is also possible to employ a construction in which any number of guide concave grooves, retaining concave grooves, and rotation restraining members are provided in an arbitrary number of three or more. When the guide concave grooves, retaining concave grooves, and rotation restraining members are provided, the guide concave grooves, retaining concave grooves, and rotation restraining members can be arranged so as to be uniformly spaced in the circumferential direction as well as to be spaced at irregular intervals in the circumferential direction.

REFERENCE SIGNS LIST

1 Ball screw device
2 Screw shaft
3, 3a Nut
4 Balls
5 Housing
6, 6a Rotation restraining members
7 Insertion hole
8 Load path
9 Circulation groove
10 Screw portion
11, 11a, 11b First fitting shaft portion
12 Second fitting shaft portion
13 Shaft-side ball thread groove
14 Male spline teeth
15 Nut-side ball thread groove
16 Small-diameter surface portion
17 Large-diameter surface portion
18, 18a Guide concave groove
19 Non-rotating side engaging portion
20 Nut insertion portion
21, 21a Retaining concave groove
22 Fixing hole portion
23 Locking concave groove
24 Cylinder hole portion
25a, 25b Seal concave groove
26a, 26b O-ring
27 Bottom surface
28 Large-diameter stepped surface
29 Small-diameter stepped surface
30 Rolling bearing
31 Outer ring
31a Outer ring raceway
32 Inner ring
32a Inner ring raceway
33 Rolling bodies
34 Cage
35 Piston
36 Cylindrical portion
37 Partition wall portion
38a, 38b Space
39 Coil spring
40, 40a, 40b Stopper
41, 41a, 41b Boss portion
42 Rotating side engaging portion
43, 43a, 43b Engaging hole
44 Female spline teeth
45 Outward flange portion
46 Flat outer surface
47 Flat inner surface
48, 48a Fixing portion
49 Flat outer surface
50 Spline teeth
51 Engaging concave groove
52 Engaging claw portion
53 Gap
54 Engaging concave portion
100 Ball screw device
101 Screw shaft
102 Nut
103 Balls
104 Advance/retreat member
105 Housing
106 Shaft-side ball thread groove
107 Nut-side ball thread groove
108 Load path
109 Key groove
110 Insertion hole
111 Key

The invention claimed is:

1. A ball screw device including:
a screw shaft having a shaft-side ball thread groove with a spiral shape on an outer-circumferential surface thereof and rotationally moving during use,
a nut having a nut-side ball thread groove with a spiral shape on an inner-circumferential surface thereof and linearly moving during use,
balls arranged between the shaft-side ball thread groove and the nut-side ball thread groove,
a housing having an insertion hole through which the nut can be inserted in an axial direction, and
a rotation restraining member for preventing relative rotation of the nut with respect to the housing,
the nut having a guide concave groove on an outer-circumferential surface, the guide concave groove capable of engaging with the rotation restraining member in a circumferential direction,
the insertion hole having a retaining concave groove on an inner-circumferential surface, the retaining concave groove capable of engaging with the rotation restraining member in the circumferential direction, and
the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction,
wherein
the nut has a circulation groove on the inner-circumferential surface, and
the guide concave groove is arranged so as to be shifted from the circulation groove in the circumferential direction.

2. The ball screw device according to claim 1, wherein
the circulation groove of the nut is configured by a plurality of circulation grooves provided at locations evenly spaced in the circumferential direction, and
the guide concave groove is arranged so as to be shifted by the same angle to opposite sides in the circumferential direction from two circulation grooves of the plurality of circulation grooves that are adjacent to each other in the circumferential direction.

3. A ball screw device including:
a screw shaft having a shaft-side ball thread groove with a spiral shape on an outer-circumferential surface thereof and rotationally moving during use,
a nut having a nut-side ball thread groove with a spiral shape on an inner-circumferential surface thereof and linearly moving during use,
balls arranged between the shaft-side ball thread groove and the nut-side ball thread groove,
a housing having an insertion hole through which the nut can be inserted in an axial direction, and
a rotation restraining member for preventing relative rotation of the nut with respect to the housing,
the nut having a guide concave groove on an outer-circumferential surface, the guide concave groove capable of engaging with the rotation restraining member in a circumferential direction,
the insertion hole having a retaining concave groove on an inner-circumferential surface, the retaining concave groove capable of engaging with the rotation restraining member in the circumferential direction, and
the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction,
wherein
a circulation component is provided, the circulation component having the circulation groove and fixed to the nut, and
the guide concave groove is arranged so as to be shifted from the circulation component in the circumferential direction.

4. The ball screw device according to claim 3, wherein
the circulation component is configured by a plurality of circulation components provided at locations evenly spaced in the circumferential direction, and
the guide concave groove is arranged so as to be shifted by the same angle to opposite sides in the circumferential direction from two circulation components of the plurality of circulation components that are adjacent to each other in the circumferential direction.

5. The ball screw device according to claim 1, wherein
the guide concave groove is configured by a plurality of guide concave grooves, and
the rotation restraining member is configured by a plurality of rotation restraining members provided in the same number as the plurality of guide concave grooves.

6. A ball screw device including:
a screw shaft having a shaft-side ball thread groove with a spiral shape on an outer-circumferential surface thereof and rotationally moving during use,
a nut having a nut-side ball thread groove with a spiral shape on an inner-circumferential surface thereof and linearly moving during use,
balls arranged between the shaft-side ball thread groove and the nut-side ball thread groove,
a housing having an insertion hole through which the nut can be inserted in an axial direction, and
a rotation restraining member for preventing relative rotation of the nut with respect to the housing,
the nut having a guide concave groove on an outer-circumferential surface, the guide concave groove capable of engaging with the rotation restraining member in a circumferential direction,
the insertion hole having a retaining concave groove on an inner-circumferential surface, the retaining concave groove capable of engaging with the rotation restraining member in the circumferential direction, and
the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction,
wherein
the nut includes an outward flange portion protruding toward outside in the radial direction, and
the guide concave groove is provided only in the outward flange portion.

7. A ball screw device including:
a screw shaft having a shaft-side ball thread groove with a spiral shape on an outer-circumferential surface thereof and rotationally moving during use,
a nut having a nut-side ball thread groove with a spiral shape on an inner-circumferential surface thereof and linearly moving during use,
balls arranged between the shaft-side ball thread groove and the nut-side ball thread groove,
a housing having an insertion hole through which the nut can be inserted in an axial direction, and
a rotation restraining member for preventing relative rotation of the nut with respect to the housing,
the nut having a guide concave groove on an outer-circumferential surface, the guide concave groove capable of engaging with the rotation restraining member in a circumferential direction,
the insertion hole having a retaining concave groove on an inner-circumferential surface, the retaining concave groove capable of engaging with the rotation restraining member in the circumferential direction, and
the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction,
wherein the rotation restraining member is prevented from coming off in the axial direction by surfaces that axially face an end surface on one side in the axial direction and an end surface on the other side in the axial direction of the rotation restraining member, and
wherein a gap is provided between the end surface on the one side in the axial direction of the rotation restraining member and a surface that axially faces the end surface on the one side in the axial direction, and/or between the end surface on the other side in the axial direction of the rotation restraining member and a surface that axially face the end surface on the other side in the axial direction.

8. A ball screw device including:
a screw shaft having a shaft-side ball thread groove with a spiral shape on an outer-circumferential surface thereof and rotationally moving during use,
a nut having a nut-side ball thread groove with a spiral shape on an inner-circumferential surface thereof and linearly moving during use,
balls arranged between the shaft-side ball thread groove and the nut-side ball thread groove, a housing having an insertion hole through which the nut can be inserted in an axial direction, and a rotation restraining member for preventing relative rotation of the nut with respect to the housing, the nut having a guide concave groove on an outer-circumferential surface, the guide concave groove capable of engaging with the rotation restraining member in a circumferential direction, the insertion hole having a retaining concave groove on an inner-circumferential surface, the retaining concave groove capable of engaging with the rotation restraining member in the circumferential direction, and the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction, wherein the rotation restraining member is prevented from coming off in the axial direction by surfaces that axially face an end surface on one side in the axial direction and an end surface on the other side in the axial direction of the rotation restraining member, and wherein the rotation restraining member is supported and fixed to the housing by being held from both sides in the axial direction by the surfaces that axially face the end surfaces on both sides in the axial direction of the rotation restraining member.

9. A ball screw device including:

a screw shaft having a shaft-side ball thread groove with a spiral shape on an outer-circumferential surface thereof and rotationally moving during use, a nut having a nut-side ball thread groove with a spiral shape on an inner-circumferential surface thereof and linearly moving during use, balls arranged between the shaft-side ball thread groove and the nut-side ball thread groove, a housing having an insertion hole through which the nut can be inserted in an axial direction, and a rotation restraining member for preventing relative rotation of the nut with respect to the housing, the nut having a guide concave groove on an outer-circumferential surface, the guide concave groove capable of engaging with the rotation restraining member in a circumferential direction, the insertion hole having a retaining concave groove on an inner-circumferential surface, the retaining concave groove capable of engaging with the rotation restraining member in the circumferential direction, and the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction, wherein the rotation restraining member is prevented from coming off in the axial direction by surfaces that axially face an end surface on one side in the axial direction and an end surface on the other side in the axial direction of the rotation restraining member, and wherein a surface that axially faces the end surface on the other side in the axial direction of the rotation restraining member is provided in an engaging concave portion that is provided on a small-diameter stepped surface facing the one side in the axial direction provided in the insertion hole, and the end portion on the other side in the axial direction of the rotation restraining member is engaged with the engaging concave portion.

10. A ball screw device including:

a screw shaft having a shaft-side ball thread groove with a spiral shape on an outer-circumferential surface thereof and rotationally moving during use, a nut having a nut-side ball thread groove with a spiral shape on an inner-circumferential surface thereof and linearly moving during use, balls arranged between the shaft-side ball thread groove and the nut-side ball thread groove, a housing having an insertion hole through which the nut can be inserted in an axial direction, and a rotation restraining member for preventing relative rotation of the nut with respect to the housing, the nut having a guide concave groove on an outer-circumferential surface, the guide concave groove capable of engaging with the rotation restraining member in a circumferential direction, the insertion hole having a retaining concave groove on an inner-circumferential surface, the retaining concave groove capable of engaging with the rotation restraining member in the circumferential direction, and the rotation restraining member configured by a shaft-shaped member extending in the axial direction, and having an outside portion in a radial direction thereof arranged inside the retaining concave groove and an inside portion in the radial direction arranged inside the guide concave groove so as to be able to relatively slide in the axial direction, wherein a piston is provided, the piston fixed to the nut and linearly moving together with the nut, the nut has a small-diameter surface portion having the nut-side ball thread groove formed on the inner-circumferential surface and a large-diameter surface portion having a cylindrical surface shape with an inner diameter larger than that of the small-diameter surface portion and deviated from the small-diameter surface portion in the axial direction, and the piston is fitted and fixed inside the large-diameter surface portion.

* * * * *